(12) United States Patent
Lee et al.

(10) Patent No.: US 9,749,146 B2
(45) Date of Patent: Aug. 29, 2017

(54) APPARATUS AND METHODS FOR PROVIDING HOME NETWORK SERVICE

(71) Applicant: Electronics and Telecommunications Research Institute, Daejeon (KR)

(72) Inventors: Eun Seo Lee, Daejeon (KR); Jun Hee Park, Daejeon (KR); Hyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 20 days.

(21) Appl. No.: 14/918,682

(22) Filed: Oct. 21, 2015

(65) Prior Publication Data

US 2016/0112213 A1    Apr. 21, 2016

(30) Foreign Application Priority Data

Oct. 21, 2014 (KR) .................. 10-2014-0142682
Jul. 24, 2015 (KR) .................. 10-2015-0105267
Jul. 24, 2015 (KR) .................. 10-2015-0105364

(51) Int. Cl.
*H04W 24/00* (2009.01)
*H04L 12/28* (2006.01)
*H04L 12/24* (2006.01)
*H04L 29/08* (2006.01)

(52) U.S. Cl.
CPC .......... *H04L 12/2809* (2013.01); *H04L 41/00* (2013.01); *H04L 67/34* (2013.01); *H04L 2012/2841* (2013.01)

(58) Field of Classification Search
CPC ....... H04W 48/04; H04W 8/08; H04W 60/00; H04W 64/00; H04W 8/06; H04W 8/04; H04W 8/12; H04W 8/18; H04W 12/06; H04W 60/04; H04W 8/26
USPC ................ 455/457, 456.3, 456.2, 433, 435.1
See application file for complete search history.

(56) References Cited

U.S. PATENT DOCUMENTS

| | | | |
|---|---|---|---|
| 7,376,723 B2 | 5/2008 | Cho et al. | |
| 2004/0117440 A1* | 6/2004 | Singer | G06F 21/10 709/203 |
| 2005/0240773 A1* | 10/2005 | Hilbert | H04L 63/105 713/182 |
| 2006/0089991 A1* | 4/2006 | Sanders | H04M 1/2535 709/227 |
| 2006/0174328 A1* | 8/2006 | Dawson | H04L 12/2803 726/4 |
| 2007/0262257 A1* | 11/2007 | Monro | G01J 3/42 250/340 |
| 2008/0140677 A1 | 6/2008 | Shin et al. | |
| 2009/0262724 A1* | 10/2009 | Suzuki | H04L 67/1095 370/352 |
| 2009/0305688 A1* | 12/2009 | Bonnet | H04L 12/1822 455/422.1 |
| 2010/0005520 A1* | 1/2010 | Abbot | G06Q 30/0255 726/6 |

(Continued)

*Primary Examiner* — Dominic Rego
(74) *Attorney, Agent, or Firm* — William Park & Associates Ltd.

(57) ABSTRACT

An apparatus and method for providing a home network service are provided. The method may include creating a user account in a server, receiving first initial setting information from an electronic device, transmitting second initial setting information to the electronic device, and receiving a message regarding registration of the electronic device from the server.

5 Claims, 20 Drawing Sheets

(56) References Cited

U.S. PATENT DOCUMENTS

| | | | | | |
|---|---|---|---|---|---|
| 2010/0153726 | A1* | 6/2010 | Liu | .......................... | H04L 9/083 713/171 |
| 2010/0197305 | A1* | 8/2010 | Atarius | ............... | H04L 65/1016 455/435.1 |
| 2010/0287270 | A1* | 11/2010 | Hashimoto | ............. | H04L 12/66 709/223 |
| 2010/0313019 | A1* | 12/2010 | Joubert | ................ | G06F 21/313 713/168 |
| 2011/0067093 | A1* | 3/2011 | Kamada | .................. | G06F 21/10 726/7 |
| 2011/0099589 | A1* | 4/2011 | Woo | ........................ | H04N 7/106 725/81 |
| 2011/0246267 | A1* | 10/2011 | Williams | ............... | G06Q 30/02 705/14.4 |
| 2012/0134323 | A1* | 5/2012 | Perkuhn | ................. | H04W 8/06 370/328 |
| 2012/0231770 | A1* | 9/2012 | Clarke | ................ | H04L 12/5885 455/414.1 |
| 2012/0239673 | A1* | 9/2012 | Yun | ................... | G06F 17/30247 707/758 |
| 2012/0276875 | A1* | 11/2012 | Shu | ........................ | H04W 60/06 455/411 |
| 2013/0111355 | A1* | 5/2013 | Jennings | ............. | H04L 12/1822 715/753 |
| 2013/0339400 | A1* | 12/2013 | Pflughoeft | ......... | G06F 17/30289 707/803 |
| 2014/0053246 | A1* | 2/2014 | Huang | .................... | H04L 63/06 726/4 |
| 2014/0181513 | A1* | 6/2014 | Marek | ................... | H04L 63/062 713/168 |
| 2014/0247941 | A1* | 9/2014 | Gu | ........................ | H04L 63/062 380/270 |
| 2014/0254466 | A1* | 9/2014 | Wurster | ................ | H04L 12/189 370/312 |
| 2014/0266684 | A1* | 9/2014 | Poder | ................... | G08B 25/003 340/521 |
| 2014/0280632 | A1* | 9/2014 | Torgersrud | .............. | H04L 51/32 709/206 |
| 2014/0287728 | A1* | 9/2014 | Lim | ........................ | H04L 51/28 455/414.1 |

* cited by examiner

FIG. 20A

| Version | Message type | URI length | URI | Payload |
|---------|--------------|------------|-----|---------|

| Version | Message type | URI length | URI | Registration |
|---------|--------------|------------|-----|--------------|

| Version | Message type | URI length | URI |

| Version | Message type | URI length | URI | Apply result |

2070, 2075, 2080, 2085, 2090

APPARATUS AND METHODS FOR PROVIDING HOME NETWORK SERVICE

CROSS-REFERENCE TO RELATED APPLICATIONS

This application claims the benefit of Korean Patent Application No. 10-2014-0142682 filed on Oct. 21, 2014 and Korean Patent Application No. 10-2015-0105267 and Korean Patent Application No. 10-2015-0105364 filed on Jul. 24, 2015 in the Korean Intellectual Property Office, the disclosures of which are incorporated herein by reference.

BACKGROUND

1. Field of the Invention

Embodiments relate to an apparatus and method for providing a home network service, and more particularly, to an apparatus and method for providing a home network service to provide a user with various services by connecting devices with web interfaces to the Internet.

2. Description of the Related Art

Recently, due to a wide use of a Wireless Fidelity (Wi-Fi) technology, home electronic devices, for example, refrigerators, washing machines, or rice cookers have been expected to be connected to the Internet via Wi-Fi interfaces and to provide users with various services. As an optimum solution to provide the various services, a Hypertext Transfer Protocol as a web protocol may be used. However, because the HTTP is based on a Transmission Control Protocol (TCP), it is difficult to operate the HTTP in Micro Controller Unit (MCU)-based hardware. To solve the above issue, the Internet Engineering Task Force Constrained RESTful Environments (IETF CoRE) working group has standardized a Constrained Application Protocol (CoAP) that is a lightweight web-based protocol. Here, "RESTful" refers to a Representational State Transfer (REST) architecture. However, because the CoAP is based on a User Datagram Protocol (UDP), an issue of message transfer reliability in an Internet environment may occur. To this end, the IETF CoRE working group has proposed a model of utilizing the CoAP in a local network and utilizing the HTTP in an Internet network.

Despite an effort to provide a user with a network service by connecting various home electronic devices to the Internet, it may be difficult for a user who is unfamiliar with the Internet or electronic devices to initial set an electronic device, for example, to connect the electronic device to the Internet and register the electronic device. To this end, a middleware protocol technology for management and control of various devices has been developed. However, use of the middleware protocol technology is limited due to complexity of a network environment and complexity of implementation.

SUMMARY

Embodiments of the present invention provide an apparatus and method for providing a home network service using a home electronic device.

Also, embodiments of the present invention provide an apparatus and method for providing a home network service based on a Representational State Transfer (RESTful) web service.

Also, embodiments of the present invention provide an apparatus and method for providing a home network service to facilitate setting of a home electronic device based on a Restful web service.

According to an aspect, there is provided a method of providing a home network service, the method including creating a user account in a server, receiving first initial setting information from an electronic device, transmitting second initial setting information to the electronic device, and receiving a message regarding registration of the electronic device from the server.

According to another aspect, there is provided a method of providing a home network service, the method including transmitting first initial setting information to a terminal, receiving second initial setting information from the terminal, transmitting registration information for registration of an electronic device to a proxy, and receiving a registration state update message from the proxy.

According to another aspect, there is provided a method of providing a home network service, the method including receiving registration information for registration of an electronic device from the electronic device, registering the electronic device, transmitting the registration information to a server, receiving a registration completion message indicating completion of the registration of the electronic device from the server, and transmitting a registration state update message to the electronic device.

According to another aspect, there is provided a method of providing a home network service, the method including creating a user account, receiving registration information for registration of an electronic device from a proxy, registering the electronic device, transmitting a message regarding the registration of the electronic device to a terminal, and transmitting a registration completion message indicating completion of the registration of the electronic device to the proxy.

According to another aspect, there is provided a method of providing a home network service, the method including creating a user account in a server, transmitting first user information to the server, receiving an electronic device list managed by a first user from the server, transmitting information on an electronic device selected from the electronic device list to the server, and receiving a unique code of the selected electronic device from the server.

According to another aspect, there is provided a method of providing a home network service, the method comprising: creating a user account; receiving registration information for registration of an electronic device from a proxy; registering the electronic device; transmitting a message regarding the registration of the electronic device to a terminal; and transmitting a registration completion message indicating completion of the registration of the electronic device to the proxy.

The method of providing a home network service, further comprising: transmitting a request message for addition of a new user to the terminal; transmitting an electronic device list managed by the terminal to a new terminal; receiving information on an electronic device selected by the new user from the new terminal; sending, to the terminal, a user addition request to control and manage the electronic device selected by the new user; transmitting a unique code of the electronic device selected by the new user to the new terminal; receiving information for authentication of the new user from the new terminal; and transmitting the information for authentication of the new user to the proxy.

The method of providing a home network service, further comprising: receiving a user deauthentication request message from the new terminal; and transmitting the user deauthentication request message to the proxy.

The method of providing a home network service, further comprising: receiving a request for a user list of users using the electronic device from the terminal; transmitting the user list to the terminal; receiving a request for deauthentication of a predetermined user among the users from the terminal; and transmitting the request for the deauthentication of the predetermined user to the proxy.

According to another aspect, wherein the information for user authentication comprises at least one of a unique code of the electronic device and a user' ID and password.

According to another aspect, there is provided a method of providing a home network service, the method comprising: creating a user account in a server; transmitting first user information to the server; receiving an electronic device list managed by a first user from the server; transmitting information on an electronic device selected from the electronic device list to the server; and receiving a unique code of the selected electronic device from the server.

The method of providing a home network service, further comprising: selecting an electronic device of which deauthentication is to be performed; and requesting the server to perform de authentication.

The method of providing a home network service, further comprising transmitting information for user authentication to the server.

The method of providing a home network service, further comprising: receiving information for user authentication from the terminal; and transmitting the information for user authentication to the proxy.

Effect

According to embodiments of the present invention, it is possible to facilitate setting of a home electronic device based on a Representational State Transfer (RESTful) web service by providing a home network service. Thus, it is possible to allow a user to feel convenience, and possible for manufacturers of home electronic devices to easily develop technologies.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 20A, 20B, 20C and 20D are diagrams illustrating examples of a message structure used in a home network system according to an embodiment of the present invention.

DETAILED DESCRIPTION

Figure 1:
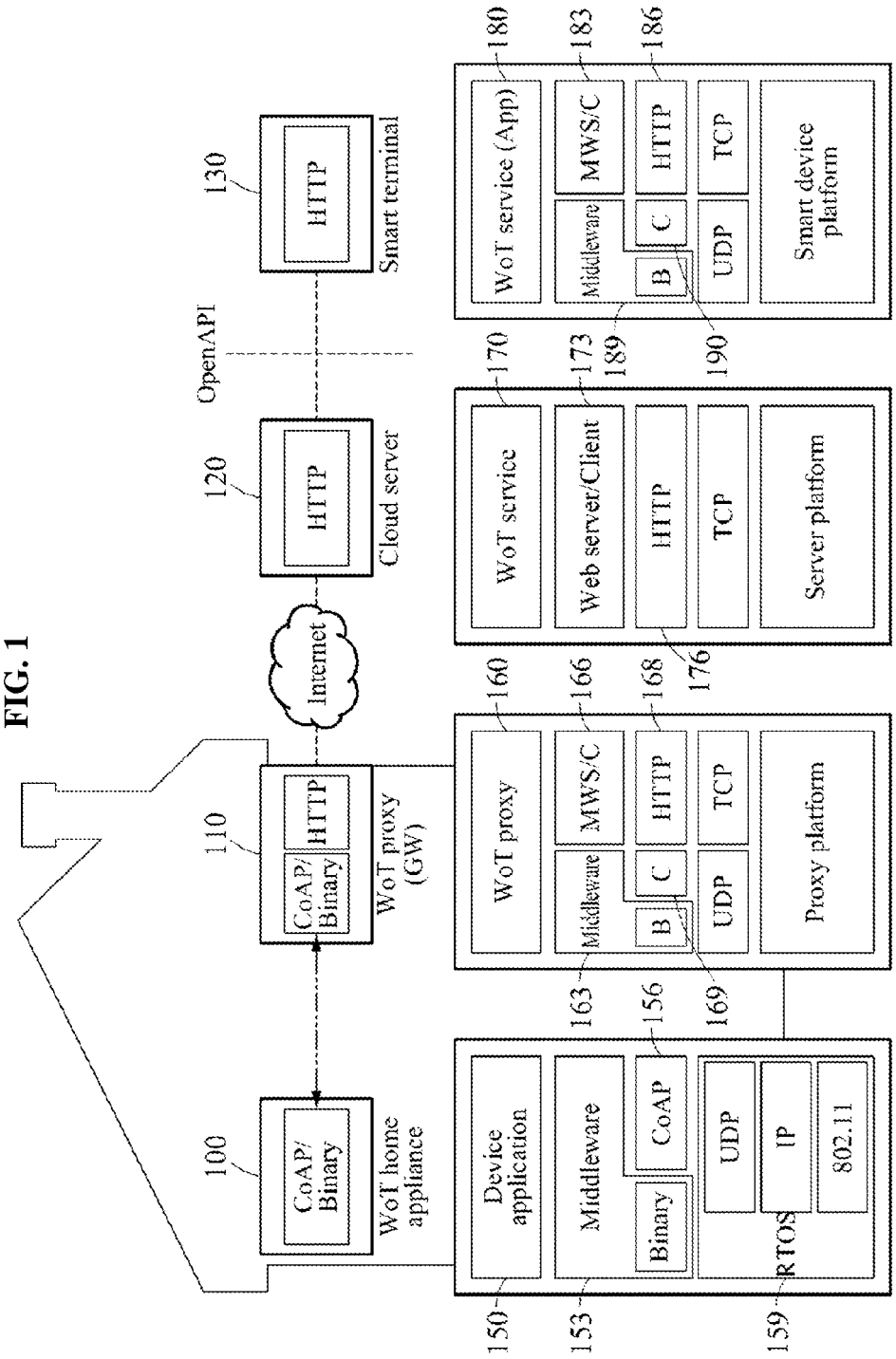
FIG. 1 is a diagram illustrating a configuration of a home network system according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 is a diagram illustrating a configuration of a home network system according to an embodiment of the present invention.

Referring to FIG. 1, the home network system may include a Web of Things (WoT) home appliance 100, a WoT proxy 110, a cloud server 120 and a smart terminal 130.

The WoT home appliance 100 (hereinafter, referred to as the "electronic device 100") may be an electronic device that has a web interface and that is used in a home, and may include, for example, a refrigerator, a washing machine and a rice cooker. The electronic device 100 may include a device application 150, middleware 153 for control and management of the electronic device 100, and a Constrained Application Protocol (CoAP) 156 that is a web software protocol to support web connectivity.

The middleware 153 may include a lightweight binary protocol to supplement a disadvantage of the CoAP 156, for example, one-way message transfer in a server/client structure. The middleware 153 and the CoAP 156 may be implemented above an embedded Real-Time Operating System (RTOS) 159 including a User Datagram Protocol (UDP) stack that transmits data based on an Internet Protocol (IP)

and an Institute of Electrical and Electronics Engineers (IEEE) 802.11 used as a wireless local area network (WLAN) standard.

The WoT proxy 110 (hereinafter, referred to as the "proxy 110") may function as a gateway to connect a home internal network to an external Internet network. The proxy 110 may include middleware 163 for device management, a Micro Web Server/Client (MWS/C) 166 based on a Hypertext Transfer Protocol (HTTP) to communicate with a service node connected to an external Internet, and a CoAP library 169 for communication with the electronic device 100. Also, the proxy 110 may include a WoT proxy 160 to transfer a message received based on the HTTP to the CoAP 156 of the electronic device 100. For example, the WoT proxy 160 may support a function of transferring a message transferred from a device to a CoAP to an external service node based on the HTTP. In this example, a proxy platform may use, for example, all OSs capable of accepting a Transmission Control Protocol (TCP) and a UDP to transfer data based on an IP.

The cloud server 120 (hereinafter, referred to as the "server" 120) may communicate with the proxy 110 and may provide an open Application Program Interface (API) to an external device. The server 120 may monitor and manage the electronic device 100 based on the HTTP via an Internet network, and may include a WoT service 170 and a web server/client 173 capable of providing a function of monitoring and managing the electronic device 100 as an open API. A server platform may use, for example, all OSs capable of accepting an IP-based TCP and an HTTP that is a typical web communication protocol may need to be used above the TCP.

The smart terminal 130 (hereinafter, referred to as the "terminal" 130) may allow a user to monitor and control the electronic device 100 using an open API. The terminal 130 may include a CoAP library 190 for a communication with the electronic device 100, middleware 189 to support an initial setting function and an access control function of the electronic device 100, a WoT service 180 to monitor and control the electronic device 100, and a web client 183 to support the open API. A smart device platform may use, for example, all OSs capable of accepting a TCP and a UDP to transfer data based on an IP. An HTTP 186 that is a typical web communication protocol may be used above a TCP stack, and the middleware 189 and the CoAP library 190 may be located above a UDP stack.

Figure 2:
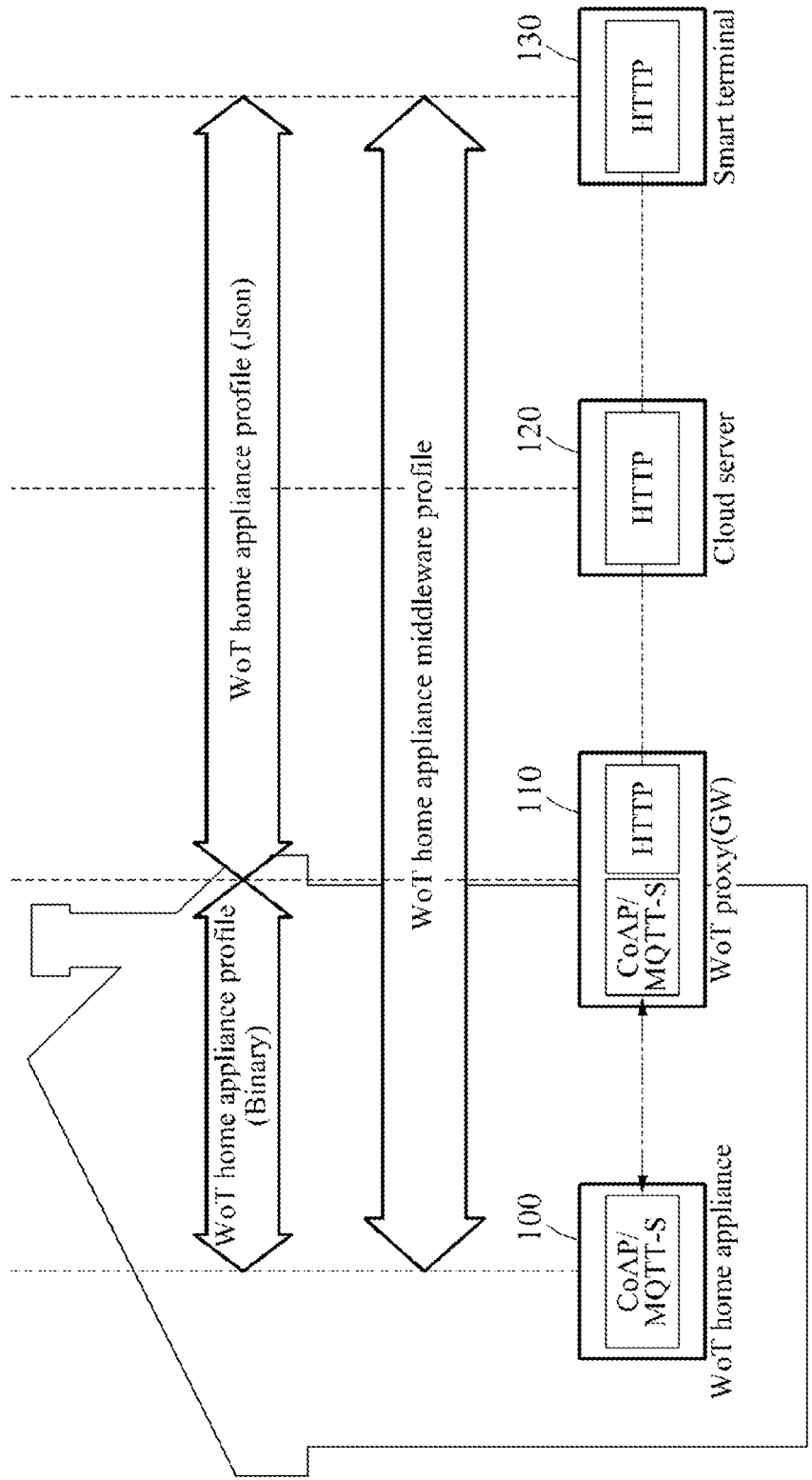
FIG. 2 is a diagram provided to explain a message type used in a home network system according to an embodiment of the present invention.

FIG. 2 is a diagram provided to explain a message type used in a home network system according to an embodiment of the present invention.

Referring to FIG. 2, CoAP-based binary messages may be used between the electronic device 100 and the proxy 110, and HTTP-based JavaScript Object Notation (JSON) messages may be used between the proxy 110, the server 120 and the terminal 130.

A middleware protocol used in an embodiment of the present invention may define a Uniform Resource Identifier (URI), methods GET, PUT, DELETE and POST, and a payload based on a Representational State Transfer (RESTful) CoAP and an HTTP. The middleware protocol may include a simple binary protocol for UDP broadcasting, to solve a constraint of a CoAP of a server/client structure in which it is impossible to actively transfer a message in the server 120. The methods may be used for discovery, advertisement and authentication. The method GET may be used for discovery, registration, information and events, and the method PUT may be used for advertisement, discovery, registration, information, events, control and authentication. In the WoT home appliance 100, various protocols, for example, an MQ Telemetry Transport for Sensors (MQTT-S) that is a protocol for communication between machines may be used.

Figure 3:
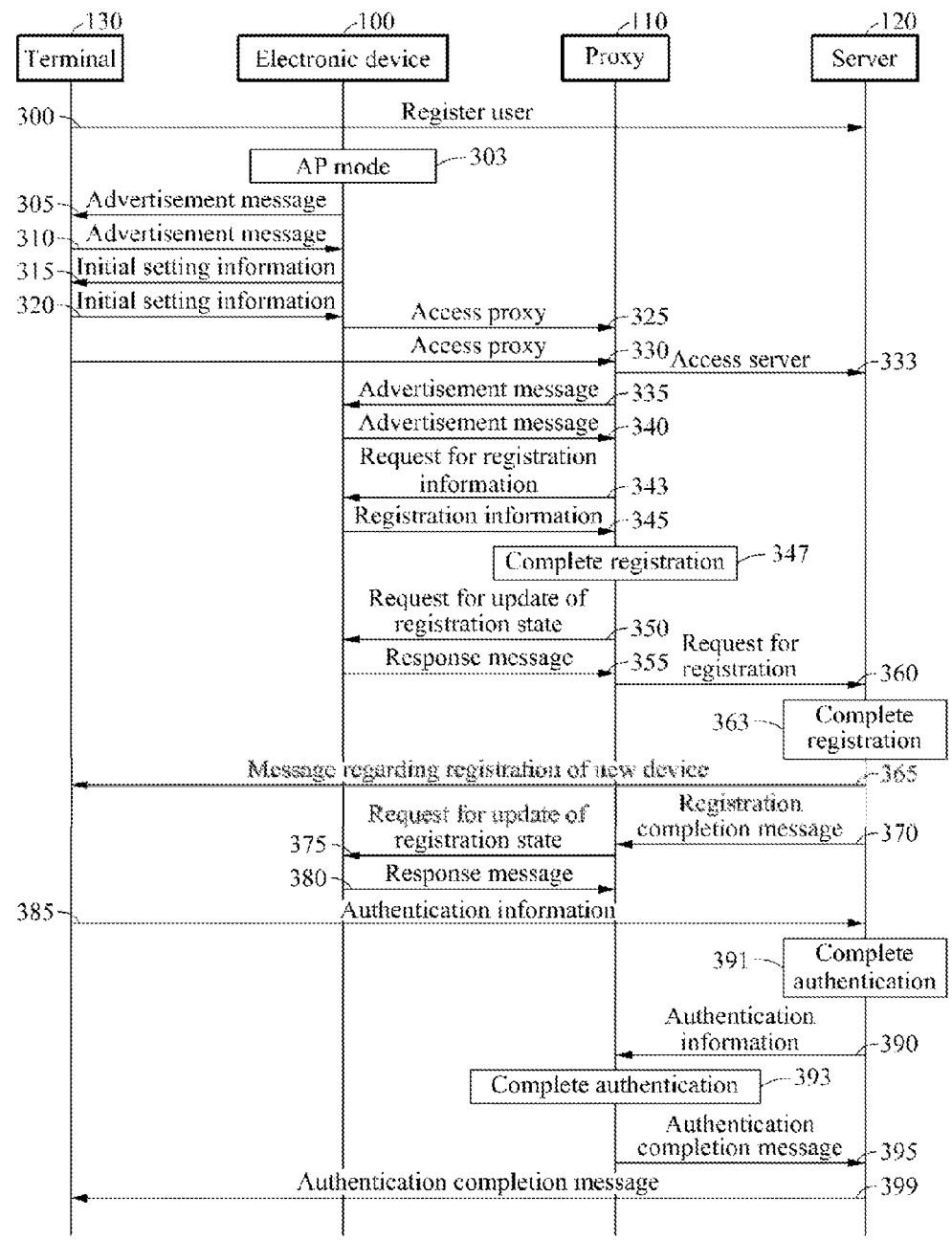
FIG. 3 is a flowchart of an initial setting method of a home network system according to an embodiment of the present invention.

FIG. 3 is a flowchart of an initial setting method of a home network system according to an embodiment of the present invention.

Referring to FIG. 3, a user may create an account in the server 120 using the terminal 130 in operation 300. The user may download an application program (app) using a Quick Response (QR) code or a Near Field Communication (NFC) function included in the electronic device 100, and may register, in the server 120, an identification (ID), a password and telephone number of the user.

When the electronic device 100 is initially powered on, the electronic device 100 may generate a unique Service Set Identifier (SSID) of the electronic device 100 and may operate in a software Access Point (AP) mode in operation 303. The terminal 130 may access the electronic device 100 by inputting the SSID. When the electronic device 100 transmits an advertisement message to the terminal 130 in operation 305, the terminal 130 may transmit advertisement message to the electronic device 100 in operation 310. The terminal 130 may know, in advance, the SSID of the electronic device 100, and may use a password if necessary.

When the terminal 130 is connected to the electronic device 100, the terminal 130 and the electronic device 100 may exchange initial setting information for initial setting in operations 315 and 320. The initial setting information may include, for example, a unique code of the electronic device 100, an SSID and a password of the proxy 110, a password and an ID of the terminal 130 registered in the server 120, and information on the terminal 130. The terminal 130 may transmit the SSID and the password of the proxy 110 to the electronic device 100. For example, the user may input the SSID and the password of the proxy 110 using an application of the terminal 130, and the input SSID and input password may be transferred to middleware of the electronic device 100 through middleware of the terminal 130.

When the initial setting information is exchanged between the terminal 130 and the electronic device 100, the terminal 130 and the electronic device 100 may access the proxy 110 using the SSID and the password of the proxy 110 in operations 325 and 330, and the terminal 130 may access the server 120 via the proxy 110 in operation 333. When the proxy 110 transmits an advertisement message to the electronic device 100 in operation 335, the electronic device 100 may transmit the advertisement message to the proxy 110 in operation 340.

The proxy 110 may determine whether the electronic device 100 is registered in the proxy 110. When it is determine that the electronic device 100 is not registered in the proxy 110, the proxy 110 may request the electronic device 100 to transmit registration information for registration of the electronic device 100 in operation 343. When the electronic device 100 transmits the registration information to the proxy 110 in operation 345, the proxy 110 may register the electronic device 100 in operation 347. The registration information may include, for example, the password and the ID of the terminal 130 registered in the server 120, the information on the terminal 130 and the unique code of the electronic device 100.

When the electronic device 100 is registered, the proxy 110 may transmit a registration state update message to the electronic device 100 in operation 350, and the electronic device 100 may transmit a response message to the registration state update message to the proxy 110 in operation 355. The proxy 110 may transmit, to the server 120, a request for registration of the electronic device 100 and the registration information in operation 360, and the server 120 may complete the registration of the electronic device 100 in operation 363 and may transmit a registration completion message to the proxy 110 in operation 370. The server 120 may transmit, to the terminal 130, a message regarding registration of a new device to indicate that the electronic device 100 is registered in the server 120 in operation 365. When the registration completion message is received from the server 120, the proxy 110 may send a request for update of a registration state to the electronic device 100 in operation 375, and the electronic device 100 may transmit a response message to the request to the proxy 110 in operation 380. When the response message is received from the electronic device 100, and when the server 120 does not transmit the message regarding the registration of the new device to the terminal 130, the proxy 110 may transmit the message regarding the registration of the new device to the terminal 130.

The terminal 130 may transmit authentication information for user authentication to the server 120 in operation 385, and the server 120 may complete server authentication (*user authentication based on the authentication information received from the terminal 130 in operation 391. When the authentication is completed, the server 120 may transmit the authentication information received from the terminal 130 to the proxy 110 in operation 390. When the proxy 110 completes authentication in operation 393, the proxy 110 may transmit an authentication completion message to the server 120 in operation 395, and the server 120 may transmit the authentication completion message to the terminal 130 in operation 399. The authentication information may include, for example, the unique code of the electronic device 100, and an ID and password of the user.

Hereinafter, messages used in the present invention will be further described.

Figure 4:
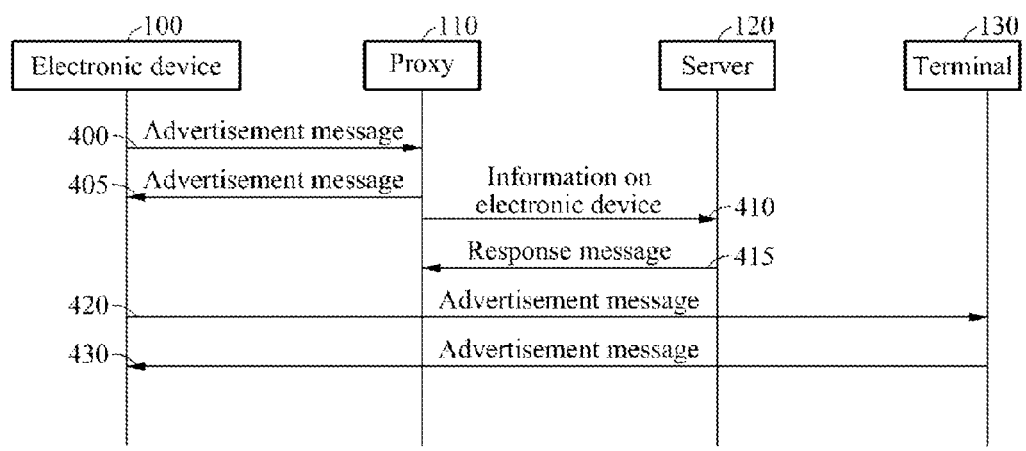
FIG. 4 is a flowchart provided to explain an example of using an advertisement message in a home network system according to an embodiment of the present invention.

FIG. 4 is a flowchart provided to explain an example of using an advertisement message in a home network system according to an embodiment of the present invention.

The advertisement message may be a message used by a predetermined device to notify the proxy 110 or another device connected to a network of URI information of the predetermined device and information regarding whether the predetermined device is registered, when the predetermined device is initially connected to the network or is powered on.

Referring to FIG. 4, when the electronic device 100 is connected to a network, the electronic device 100 may transmit an advertisement message to the proxy 110 in operation 400, and the proxy 110 may transmit another advertisement message to the electronic device 100 in operation 405. The proxy 110 may also transmit information on the electronic device 100 to the server 120 in operation 410, and the server 120 may transmit a response message to the information on the electronic device 100 to the proxy 110 in operation 415. The electronic device 100 and the terminal 130 may exchange advertisement messages with each other in operations 420 and 430.

Figure 5:
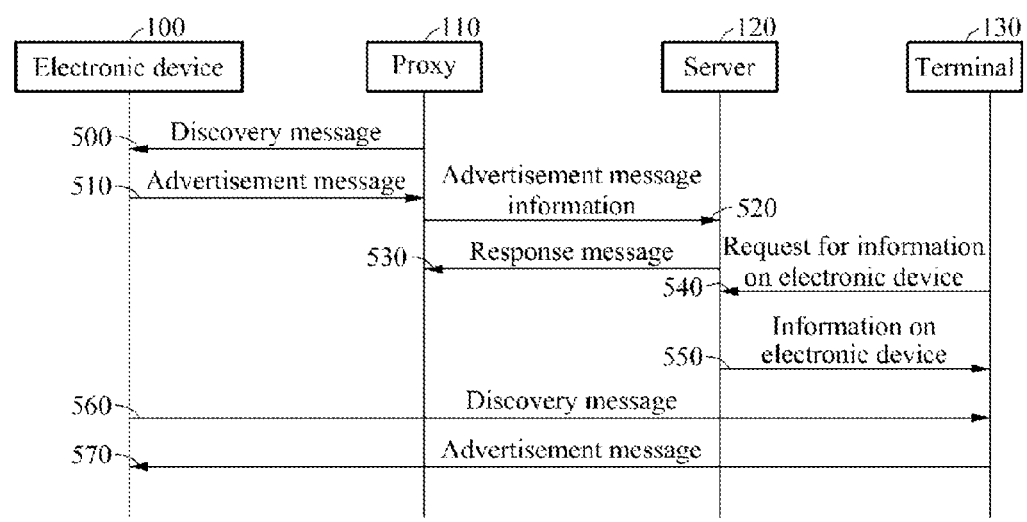
FIG. 5 is a flowchart provided to explain an example of using a discovery message in a home network system according to an embodiment of the present invention.

FIG. 5 is a flowchart provided to explain an example of using a discovery message in a home network system according to an embodiment of the present invention.

The discovery message may be used to verify presence of a predetermined device connected to a network. When a discovery message is received to a device, the device may transmit an advertisement message to respond to the discovery message. The terminal 130 may periodically perform polling, and the server 120 may store advertisement message information.

Referring to FIG. 5, when the proxy 110 transmits a discovery message to the electronic device 100 in operation 500, the electronic device 100 may transmit an advertisement message to the proxy 110 in operation 510. The proxy 110 may transmit advertisement message information on the received advertisement message to the server 120 in operation 520, and the server 120 may transmit a response message to the proxy 110 in operation 530. When the terminal 130 requests the server 120 to transmit information on the electronic device 100 in operation 540, the server 120 may transmit the information on the electronic device 100 to the terminal 130 based on the advertisement message information received from the proxy 110 in operation 550. In addition, the electronic device 100 may transmit a discovery message to the terminal 130 in operation 560. In response to the discovery message, the terminal 130 may transmit an advertisement message to the electronic device 100 in operation 570.

Figure 6:
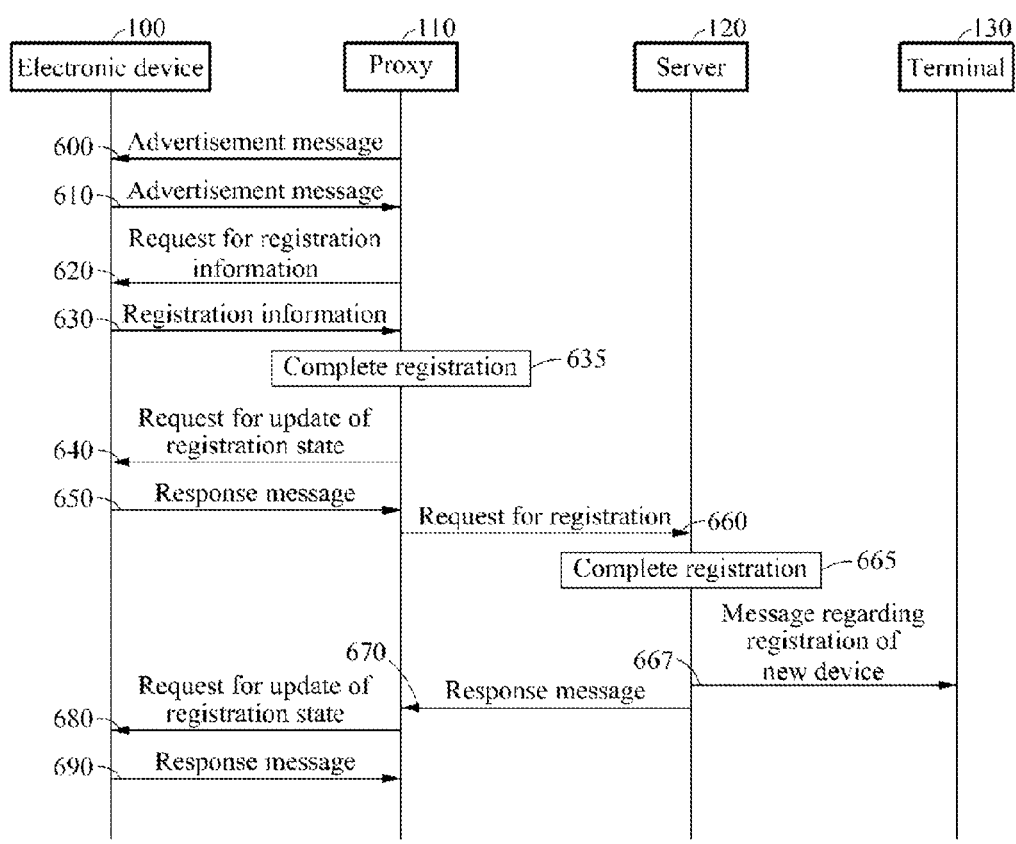
FIG. 6 is a flowchart provided to explain an example of using a registration message in a home network system according to an embodiment of the present invention.

FIG. 6 is a flowchart provided to explain an example of using a registration message in a home network system according to an embodiment of the present invention.

The registration message may be a message used to register the electronic device 100 in the proxy 110 and the server 120. Referring to FIG. 6, when the proxy 110 transmits an advertisement message to the electronic device 100 in operation 600, the electronic device 100 may transmit another advertisement message to the proxy 110 in operation 610. The proxy 110 may determine whether the electronic device 100 is registered in the proxy 110. When the electronic device 100 is determined not to be registered in the proxy 110, the proxy 110 may request the electronic device 100 to transmit registration information for registration of the electronic device 100 in operation 620. When the registration information is received from the electronic device 100 in operation 630, the proxy 110 may register the electronic device 100 in operation 635.

When the electronic device 100 is registered, the proxy 110 may request the electronic device 100 to update a registration state in operation 640, and the electronic device 100 may transmit a response message to the proxy 110 in operation 650. The proxy 110 may request the server 120 to register the electronic device 100 and transmit the registration information to the server 120 in operation 660. The server 120 may complete the registration of the electronic device 100 in operation 665, may transmit a response message to the proxy 110 in operation 670, and may transmit a message regarding registration of a new device to the terminal 130 in operation 667. When the response message is received from the server 120, the proxy 110 may request the electronic device 100 to update the registration state in operation 680, and the electronic device 100 may transmit a response message to the proxy 110 in operation 690.

Figure 7:
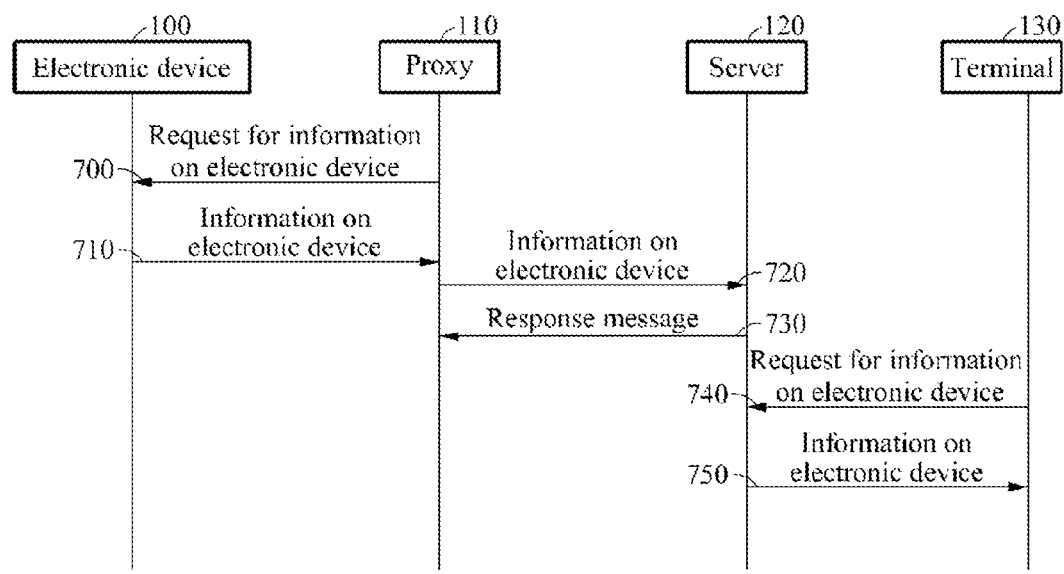
FIG. 7 is a flowchart provided to explain an example of using an information message in a home network system according to an embodiment of the present invention.

FIG. 7 is a flowchart provided to explain an example of using an information message in a home network system according to an embodiment of the present invention.

The information message may be used to request device information on a device, and the device information may include, for example, a name, a type, a model name, a manufacturer name, a hardware (H/W) version and a firmware version.

Referring to FIG. 7, when the proxy 110 requests the electronic device 100 to transmit information on the electronic device 100 in operation 700, the electronic device 100 may transmit the information on the electronic device 100 to the proxy 110 in operation 710. The proxy 110 may transmit the information on the electronic device 100 to the server 120 in operation 720, and the server 120 may transmit a response message to the proxy 110 in operation 730. When the terminal 130 requests the server 120 to transmit the information on the electronic device 100 in operation 740, the server 120 may transmit the information on the electronic device 100 to the terminal 130 in operation 750.

Figure 8:
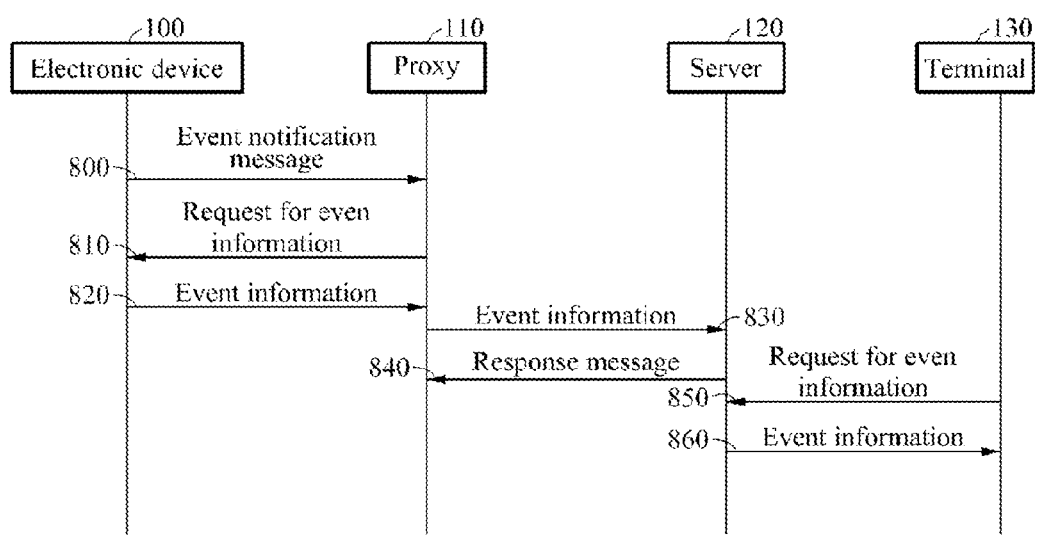
FIG. 8 is a flowchart provided to explain an example of using an event notification message in a home network system according to an embodiment of the present invention.

FIG. 8 is a flowchart provided to explain an example of using an event notification message in a home network system according to an embodiment of the present invention.

The event notification message may be used to transmit, related information in an example in which a specific event periodically occurs, such as a sensor.

Referring to FIG. 8, when the electronic device 100 transmits an event notification message to the proxy 110 in operation 800, the proxy 110 may request the electronic device 100 to transmit event information in operation 810, and the electronic device 100 may transmit the event information to the proxy 110 in operation 820. The proxy 110 may transmit the received event information to the server 120 in operation 830, and the server 120 may transmit a response message to the proxy 110 in operation 840. When the terminal 130 requests the server 120 to transmit the event information in operation 850, the server 120 may transmit the received event information to the terminal 130 in operation 860. The server 120 may also transmit a push message to the terminal 130.

Figure 9:
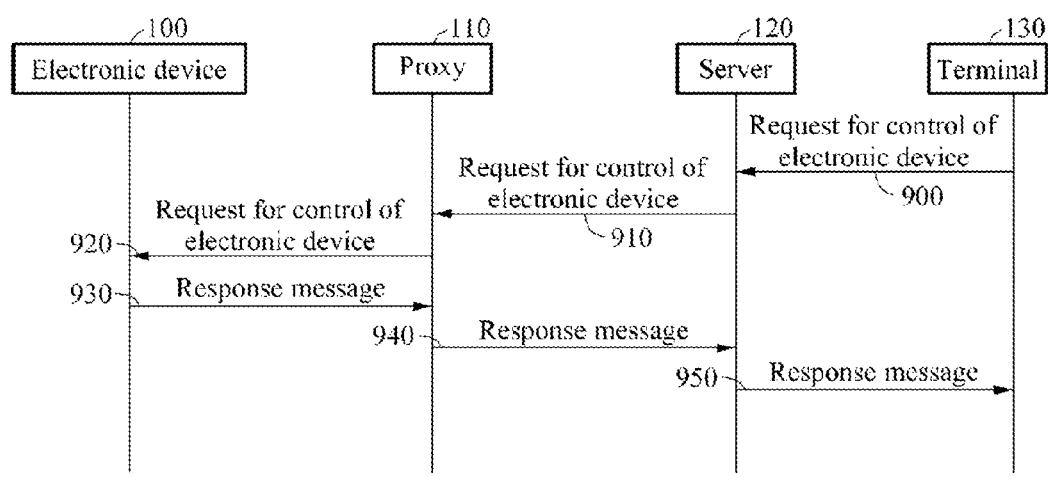
FIG. 9 is a flowchart provided to explain an example of using a control message in a home network system according to an embodiment of the present invention.

FIG. 9 is a flowchart provided to explain an example of using a control message in a home network system according to an embodiment of the present invention.

The control message may be used to control, for example, remotely control a device.

Referring to FIG. 9, when the terminal 130 requests the server 120 to control the electronic device 100 in operation 900, the server 120 may request the proxy 110 to control the electronic device 100 in operation 910. The proxy 110 may request to control the electronic device 100 in operation 920, and the electronic device 100 may transmit a response message to the proxy 110 in operation 930. When the response message is received from the electronic device 100, the proxy 110 may transmit the response message to the server 120 in operation 940, and the server 120 may transmit the response message to the terminal 130 in operation 950.

Figure 10:
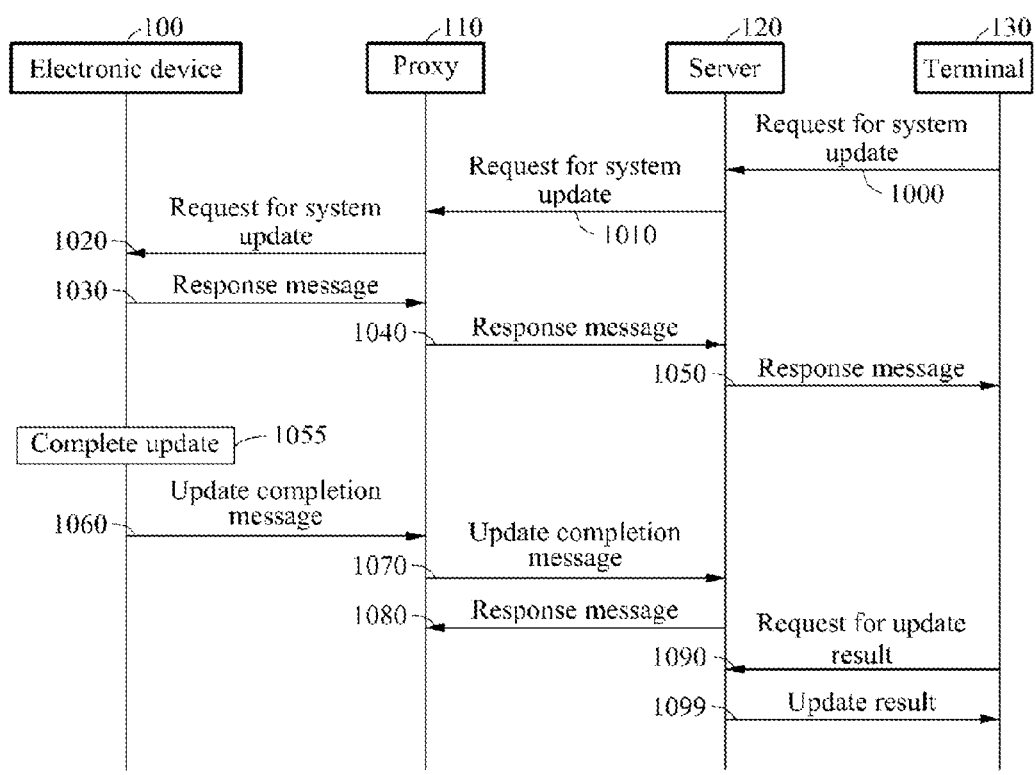
FIG. 10 is a flowchart provided to explain an example of using an apply message in a home network system according to an embodiment of the present invention.

FIG. 10 is a flowchart provided to explain an example of using an apply message in a home network system according to an embodiment of the present invention.

The apply message may be used to perform a system-related function, for example, an update function and a Wireless Fidelity (Wi-Fi) connection function.

Referring to FIG. 10, when a system of the electronic device 100 needs to be updated, the terminal 130 may request the server 120 to update the system in operation 1000. The server 120 may request the proxy 110 to update the system in operation 1010, and the proxy 110 may request the electronic device 100 to update the system in operation 1020. The electronic device 100 may transmit a response message to the proxy 110 in operation 1030, the proxy 110 may transmit the response message to the server 120 in operation 1040, and the server 120 may transmit the response message to the terminal 130 in operation 1050.

When the updating of the system is completed in operation 1055, the electronic device 100 may transmit an update completion message to the proxy 110 in operation 1060, the proxy 110 may transmit the update completion message to the server 120 in operation 1070, and the server 120 may transmit a response message to the proxy 110 in operation 1080. When the terminal 130 requests the server 120 to transmit an update result in operation 1090, the server 120 may transmit the update result to the terminal 130 in operation 1099.

Figure 11:
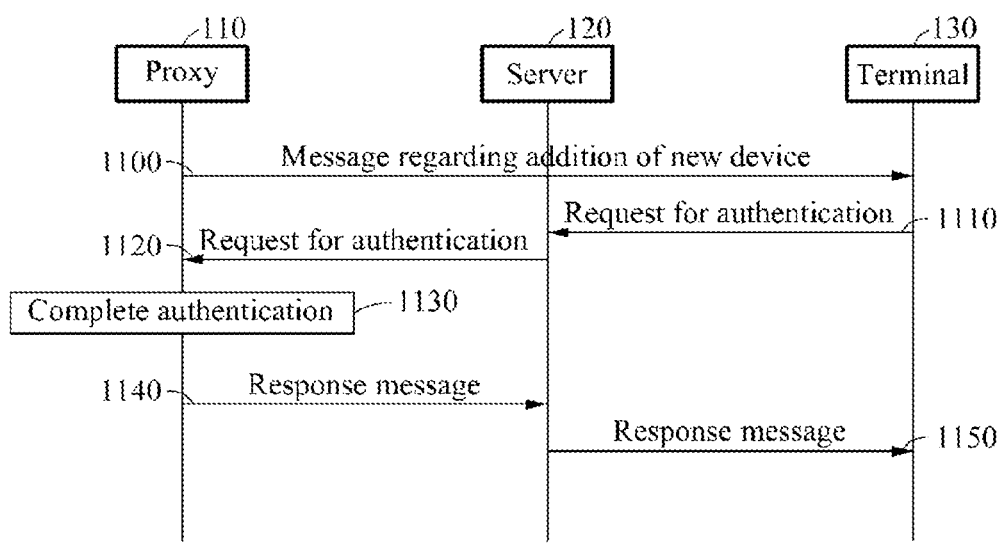
FIG. 11 is a flowchart provided to explain an example of using an authentication message in a home network system according to an embodiment of the present invention.

FIG. 11 is a flowchart provided to explain an example of using an authentication message in a home network system according to an embodiment of the present invention.

The authentication message may be used by the terminal 130 to request the proxy 110 to approve an access authority to control and manage the electronic device 100. When a message regarding registration of a new device is received from the proxy 110, the terminal 130 may transmit, to the proxy 110, a user's ID and password and a unique code of the electronic device 100, to make a request for an access authority to the electronic device 100.

Referring to FIG. 11, when the proxy 110 transmits, to the terminal 130, a message regarding addition of a new device to indicate that the electronic device 100 corresponding to the new device is registered in the server 120 in operation 1100, the terminal 130 may transmit authentication information to the server 120 and may request the server 120 to perform authentication in operation 1110, and the server 120 may transmit the authentication information received from the terminal 130 to the proxy 110 and may request the proxy 110 to perform the authentication in operation 1120. The authentication information may correspond to, for example, a user's ID and password and the unique code of the electronic device 100.

The proxy 110 may complete the authentication in operation 1130, and may transmit a response message to the server 120 in operation 1140. The server 120 may transmit the response message to the terminal 130 in operation 1150.

Figure 12:
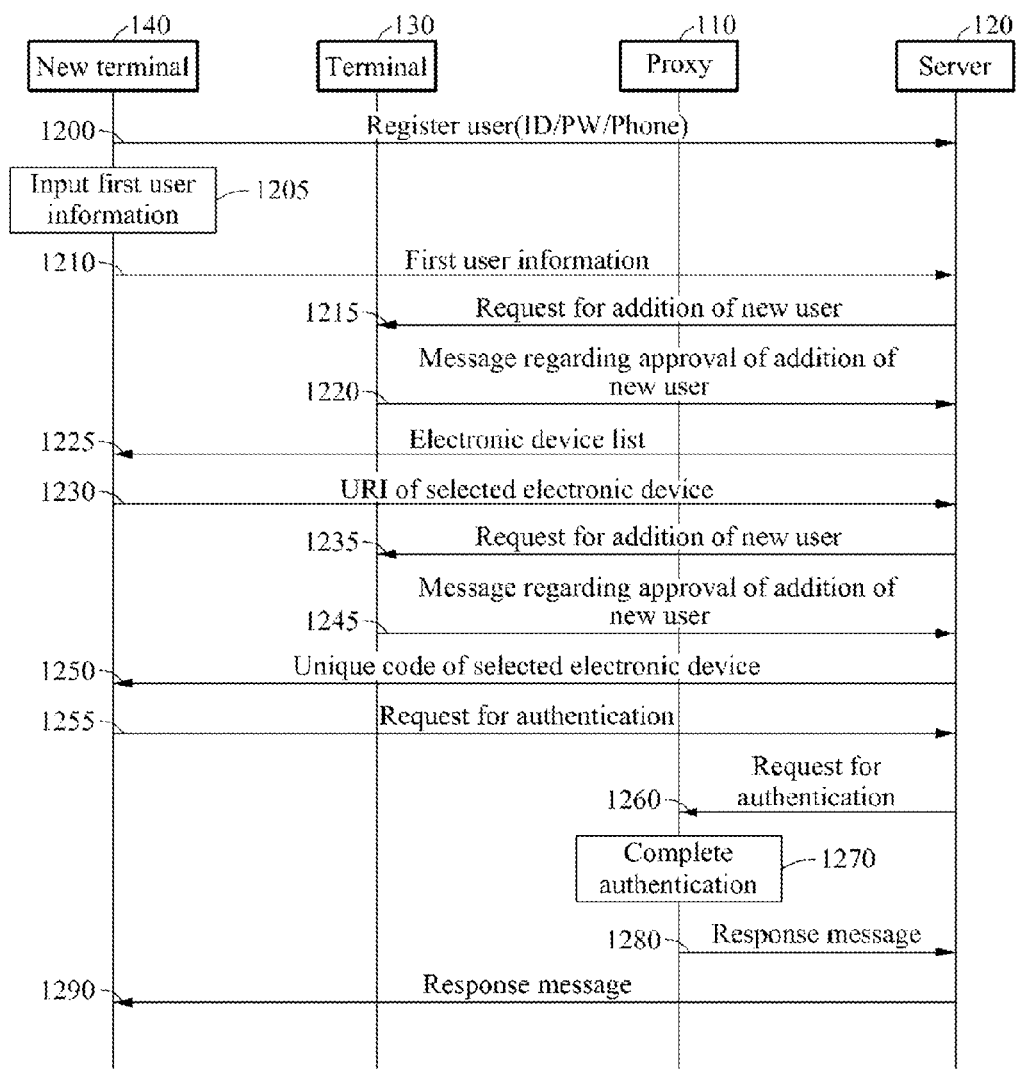
FIG. 12 is a flowchart illustrating a method of adding a user in a home network system according to an embodiment of the present invention.

FIG. 12 is a flowchart illustrating a method of adding a user in a home network system according to an embodiment of the present invention.

According to an embodiment of the present invention, the electronic device 100 may be controlled and managed by a plurality of users. When a new user is added, registration and authentication of the added user may need to be performed.

Referring to FIG. 12, an added user may create an account in the server 120 using a new terminal 140 in operation 1200. The added user may download an app using a QR code or an NFC function included in the electronic device 100, and may register, in the server 120, an ID and a password of the added user, and information on the new terminal 140.

When the account is created, the added user may notify that the added user is not the first user. For example, the added user may select, using an app, the electronic device 100 that is registered in advance, and may input first user information on the first user in operation 1205. The first user information may correspond to, for example, a telephone number of the terminal 130 and an ID of the first user. The input first user information may be transmitted to the server 120 in operation 1210.

The server 120 may transmit, to the terminal 130, information on the added user (for example, an ID of the added user) and may request the terminal 130 to add a new user in operation 1215. When the first user approves registration of the added user, the terminal 130 may transmit a message regarding an approval of addition of the new user to the server 120 in operation 1220. The server 120 may transmit an electronic device list managed by the terminal 130 to the new terminal 140 in operation 1225. When the added user selects a desired electronic device from the electronic device list, the new terminal 140 may transmit an URI of the selected electronic device to the server 120 in operation 1230.

The server 120 may transmit, to the terminal 130, the ID of the added user and the URI of the selected electronic device, and may request the terminal 130 to add the new user in operation 1235, and the terminal 130 may transmit a message regarding an approval of addition of the new user to the server 120 in operation 1245. The server 120 may transmit a unique code of the selected electronic device to the new terminal 140 in operation 1250. The new terminal 140 may transmit authentication information to the server 120 and may request the server 120 to perform authentication in operation 1255. The server 120 may transmit the authentication information to the proxy 110 and may request the proxy 110 to perform the authentication in operation 1260. When the authentication is completed in operation 1270, the proxy 110 may transmit a response message to the server 120 in operation 1280. The server 120 may transmit the response message to the new terminal 140 in operation 1290.

Figure 13:
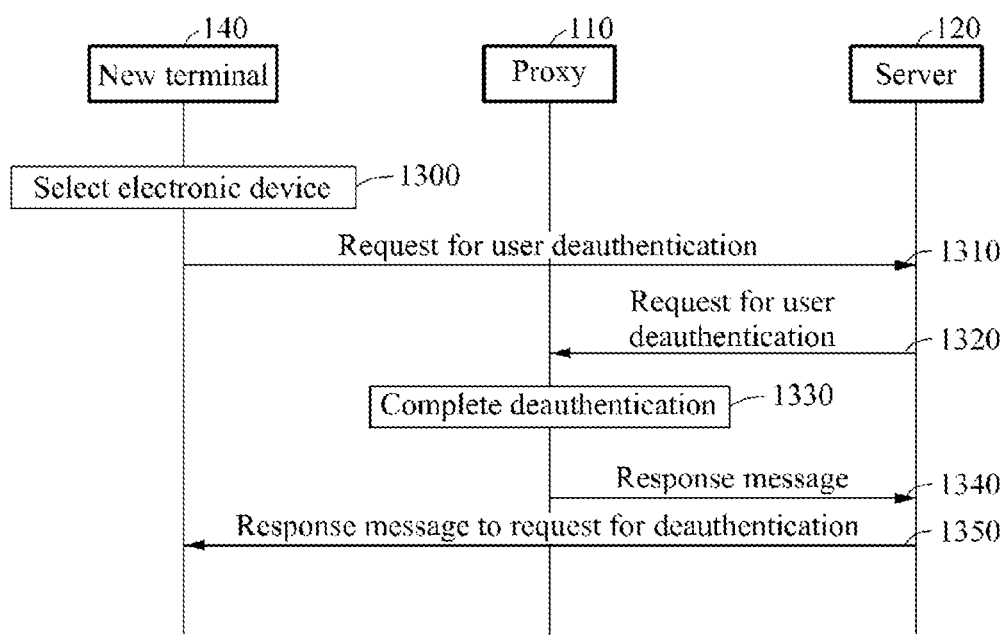
FIGS. 13 and 14 are flowcharts illustrating a method of removing a user from a home network system according to an embodiment of the present invention.
Figure 14:
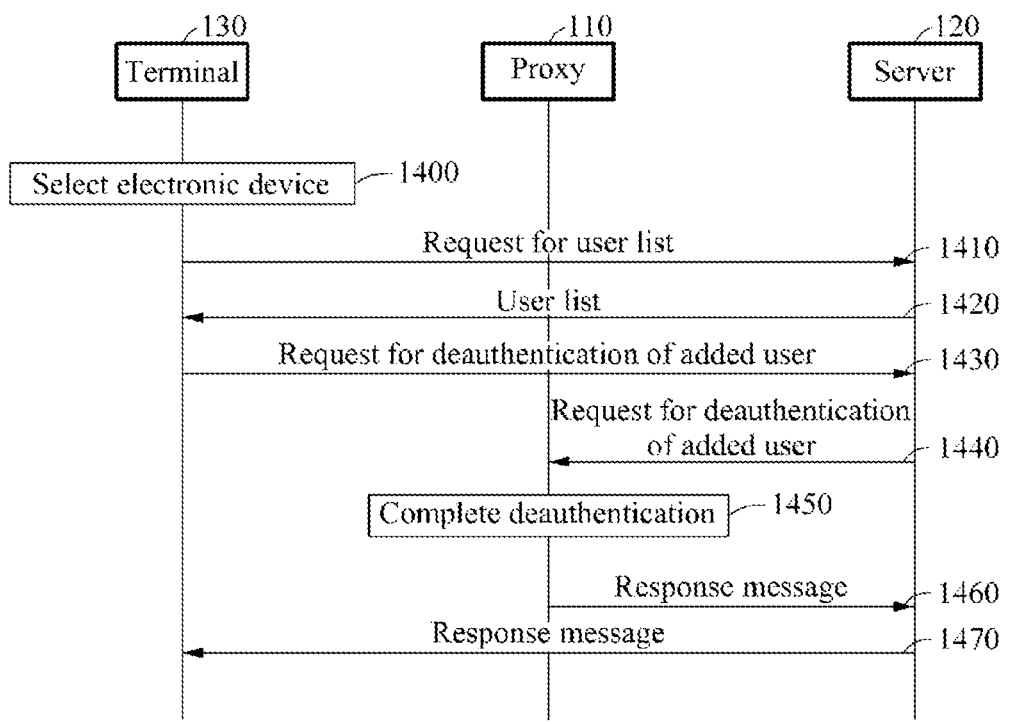

FIGS. 13 and 14 are flowcharts illustrating a method of removing a user from a home network system according to an embodiment of the present invention.

When an added user does not use the electronic device 100, a user corresponding to the electronic device 100 may need to be deleted. The added user or the first user may delete the added user. FIG. 13 illustrates an example in which the added user deletes the added user, and FIG. 14 illustrates an example in which the first user deletes the added user.

Referring to FIG. 13, the added user may select an electronic device 100 that is not used in operation 1300, and may transmit information on the added user, for example an ID of the added user, to the server 120 and may send a request for user deauthentication to the server 120 in operation 1310. Deauthentication may be performed to delete an authority to access the electronic device 100 of the added user.

The server 120 may transmit, to the proxy 110, a unique code of the selected electronic device 100 and the information on the added user, and may send a request for user deauthentication to the proxy 110 in operation 1320. The proxy 110 may complete deauthentication in operation 1330, and may transmit a response message to the server 120 in operation 1340. The server 120 may transmit the response message to the new terminal 140 in operation 1350.

Referring to FIG. 14, the first user may select an electronic device 100 that is not used by the added user in operation 1400, and may request the server 120 to transmit a user list in operation 1410. The user list may be a list of users authorized to use the selected electronic device 100, and may be, for example, a user ID list. The server 120 may transmit the user list to the terminal 130 in operation 1420.

The terminal 130 may transmit, to the server 120, the ID of the added user and the unique code of the selected electronic device 100, and may request the server 120 to perform deauthentication of the added user in operation 1430. The server 120 may transmit, to the proxy 110, the ID of the added user and the unique code of the selected electronic device 100, and may request the proxy 110 to perform the deauthentication of the added user in operation 1440. The proxy 110 may complete the deauthentication of the added user in operation 1450, and may transmit a response message to the server 120 in operation 1460. The server 120 may transmit the response message to the terminal 130 in operation 1470.

Figure 15:
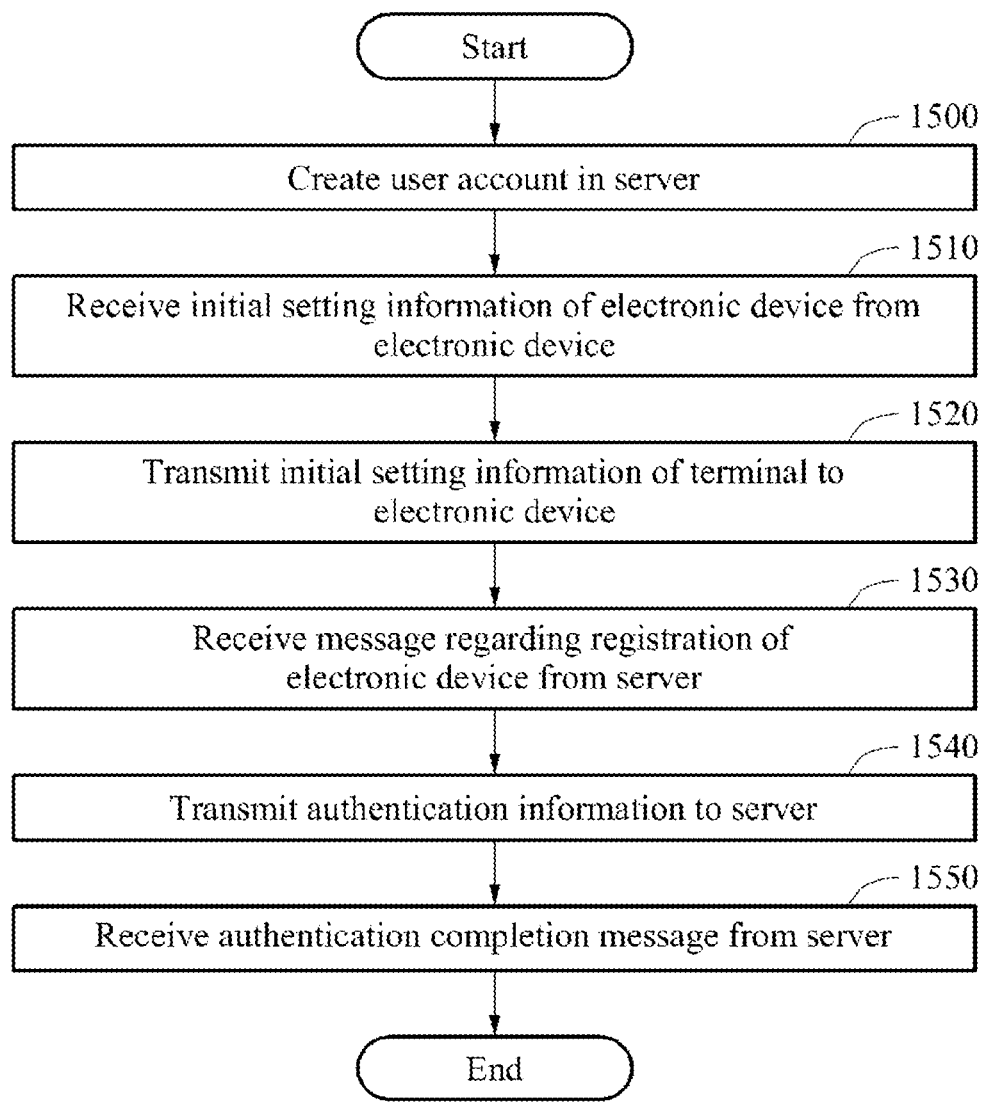
FIG. 15 is a flowchart illustrating an operation of a terminal according to an embodiment of the present invention.

FIG. 15 is a flowchart illustrating an operation of the terminal 130.

Referring to FIG. 15, the terminal 130 may create a user account in the server 120 in operation 1500, may receive initial setting information of the electronic device 100 from the electronic device 100 in operation 1510, and may transmit initial setting information of the terminal 130 to the electronic device 100 in operation 1520. The terminal 130 may receive, from the server 120, a message regarding registration of the electronic device 100 in the server 120 in operation 1530. The terminal 130 may transmit authentication information for user authentication to the server 120 in operation 1540, and may receive an authentication completion message from the server 120 in operation 1550.

Figure 16:
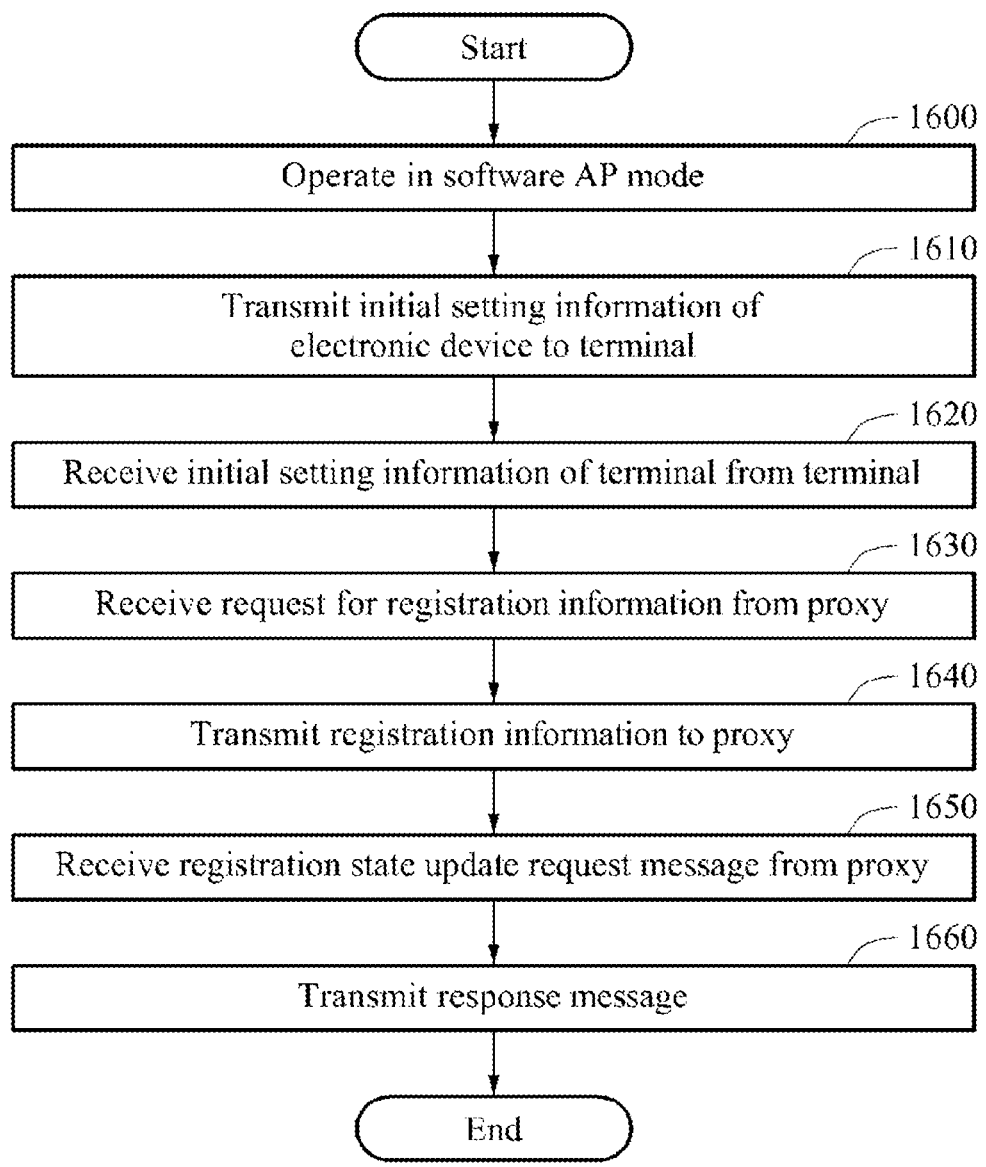
FIG. 16 is a flowchart illustrating an operation of an electronic device according to an embodiment of the present invention.

FIG. 16 is a flowchart illustrating an operation of the electronic device 100.

Referring to FIG. 16, when the electronic device 100 is powered on, the electronic device 100 may operate in a software AP mode in operation 1600. The electronic device 100 may transmit the initial setting information of the electronic device 100 to the terminal 130 in operation 1610, and may receive the initial setting information of the terminal 130 from the terminal 130 in operation 1620. When a request for registration information for registration of the electronic device 100 is received from the proxy 110 in operation 1630, the electronic device 100 may transmit the registration information to the proxy 110 in operation 1640. When the electronic device 100 is registered in the proxy 110 and the server 120, the electronic device 100 may receive a registration state update message from the proxy 110 in operation 1650, and may transmit a response message to the registration state update message to the proxy 110 in operation 1660.

Figure 17:
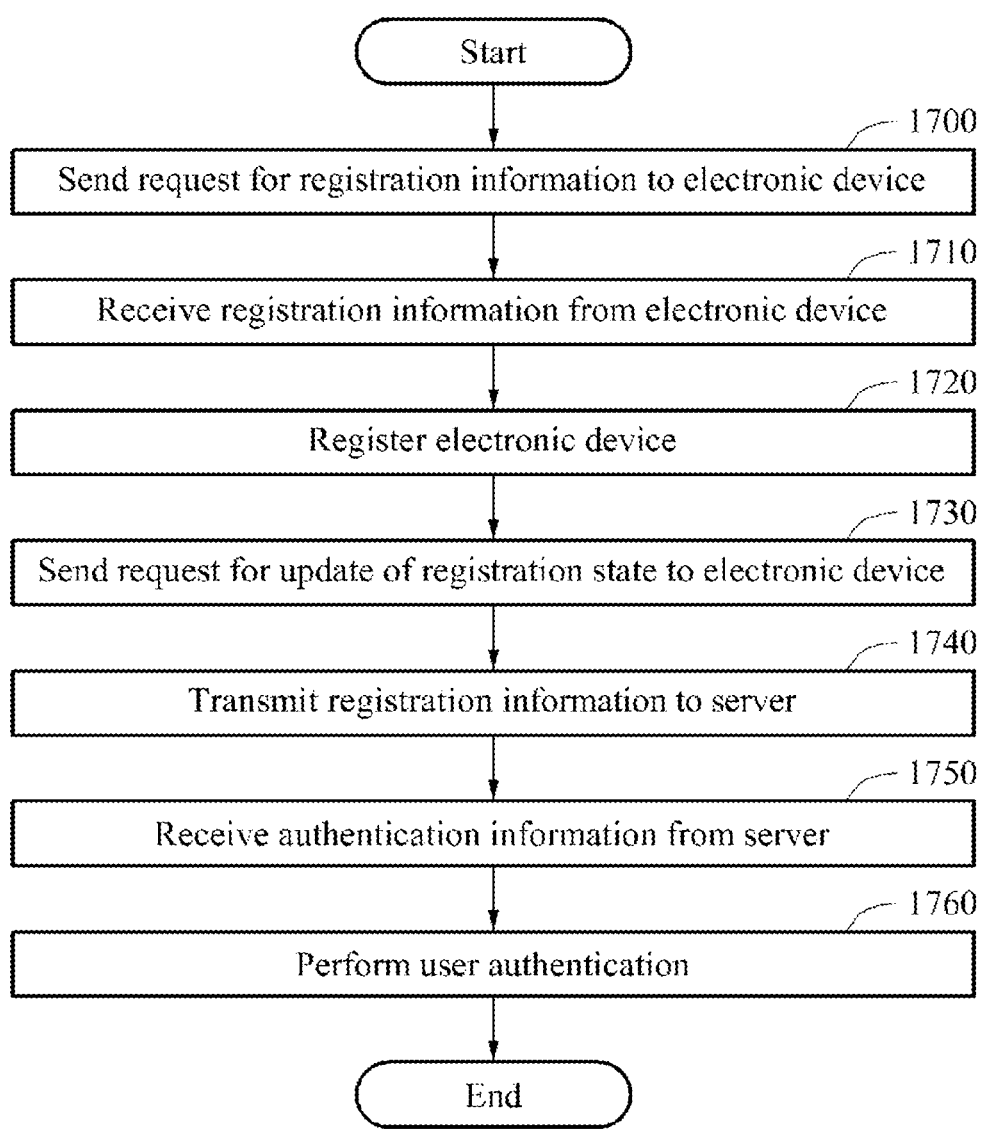
FIG. 17 is a flowchart illustrating an operation of a proxy according to an embodiment of the present invention.

FIG. 17 is a flowchart illustrating an operation of the proxy 110.

Referring to FIG. 17, when the terminal 130 and the electronic device 100 are connected to the proxy 110, the proxy 110 may send, to the electronic device 100, a request for registration information for registration of the electronic device 100 in operation 1700. When the registration information is received from the electronic device 100 in operation 1710, the proxy 110 may register the electronic device 100 in operation 1720, and may send, to the electronic device 100, a request for update of the registration state in operation 1730. The proxy 110 may transmit the registration information to the server 120 in operation 1740, and may receive a registration completion message of the electronic device 100 from the server 120. The proxy 110 may send, to the electronic device 100, a request for update of the registration state, and may receive authentication information for user authentication from the server 120 in operation 1750. The proxy 110 may perform the user authentication in operation 1760, and may transmit the authentication completion message to the server 120.

Figure 18:
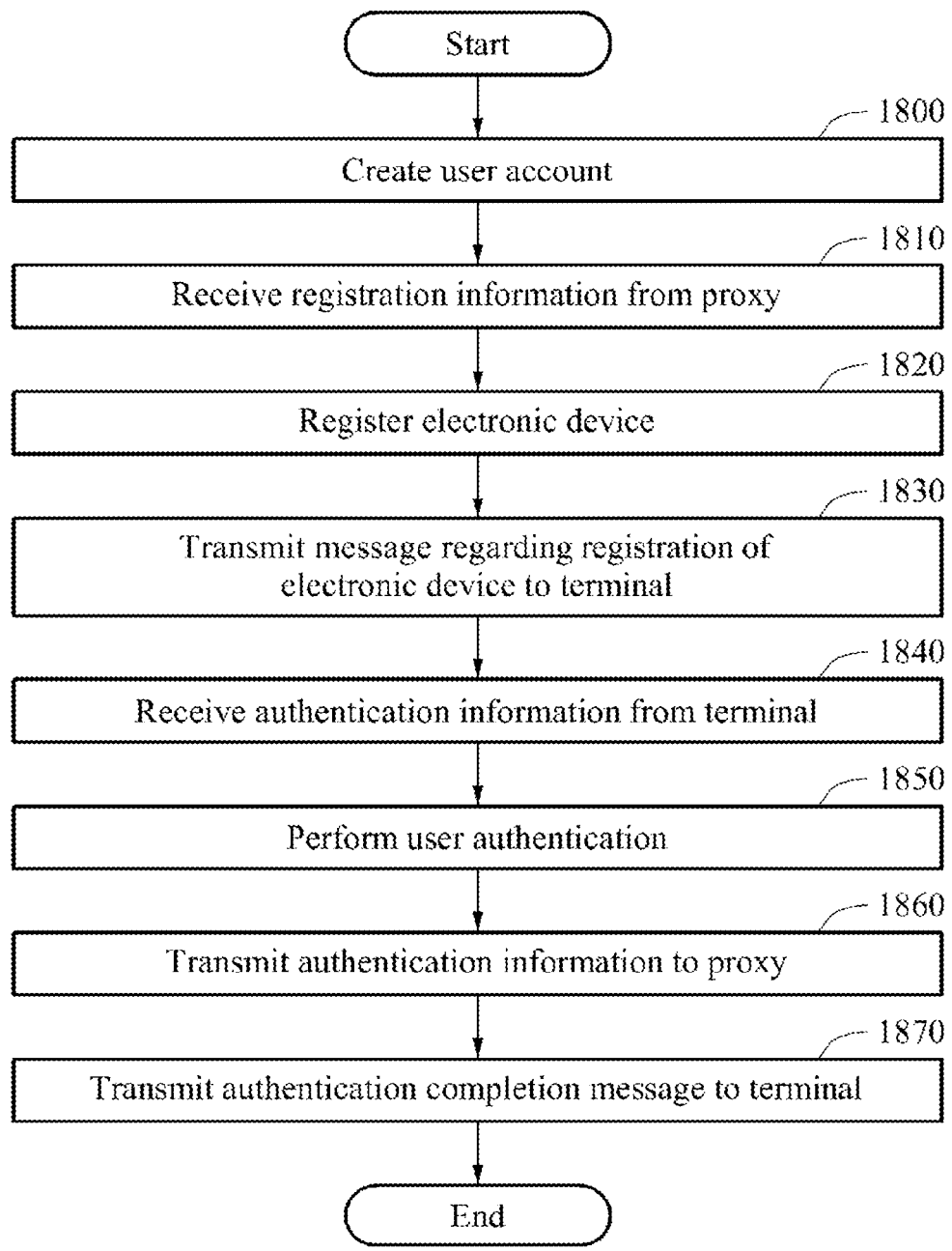
FIG. 18 is a flowchart illustrating an operation of a server according to an embodiment of the present invention.

FIG. 18 is a flowchart illustrating an operation of the server 120.

Referring to FIG. 18, when a user account creation request is received from the terminal 130, the server 120 may create a user account in operation 1800. When the registration information is received from the proxy 110 in operation 1810, the server 120 may register the electronic device 100 in operation 1820, and may transmit the message regarding the registration of the electronic device 100 to the terminal 130 in operation 1830. When the authentication information is received from the terminal 130 in operation 1840, the server 120 may perform the user authentication in operation 1850, and may transmit the authentication information to the proxy 110 in operation 1860. When the authentication completion message is received from the proxy 110, the server 120 may transmit the authentication completion message to the terminal 130 in operation 1870.

Figure 19:
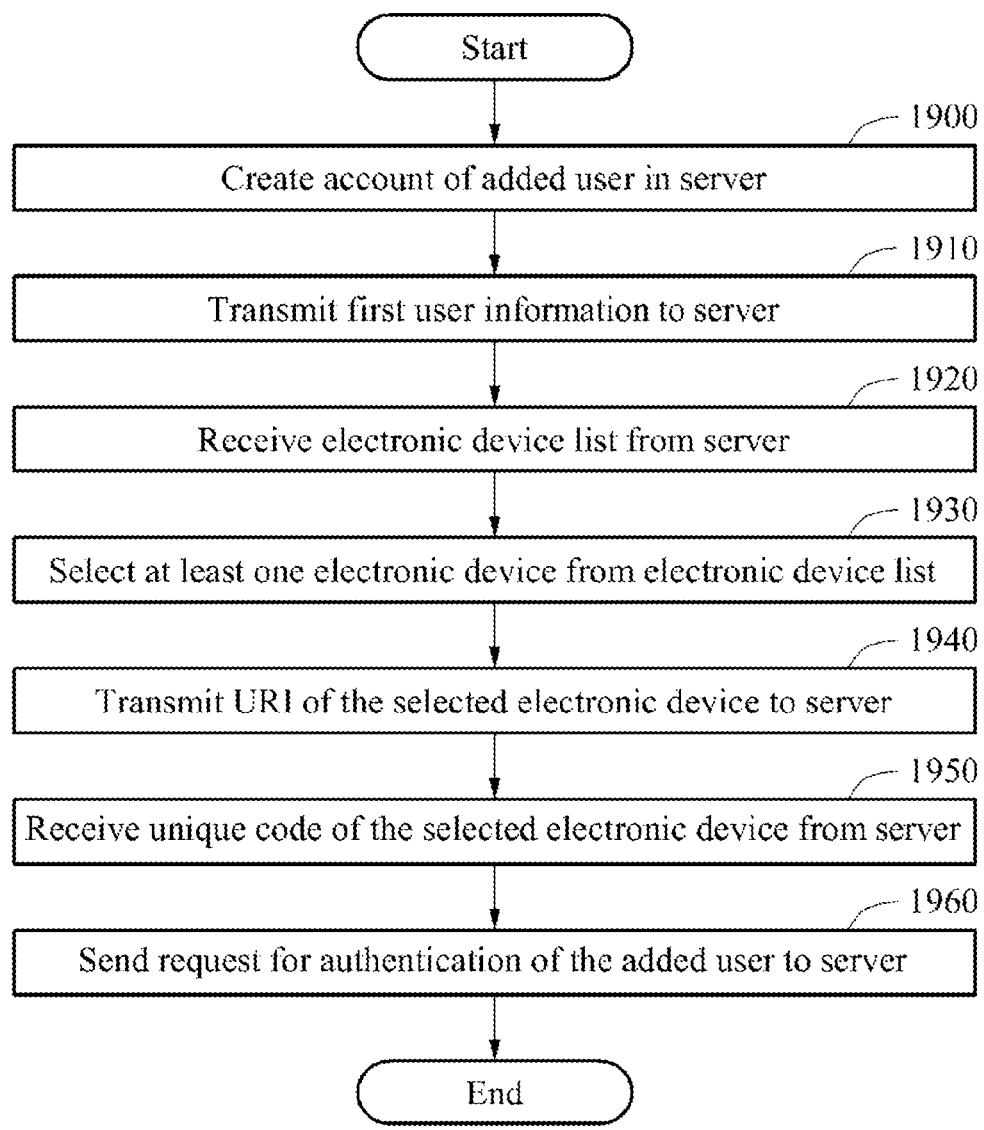
FIG. 19 is a flowchart illustrating an operation of a new terminal according to an embodiment of the present invention.

FIG. 19 is a flowchart illustrating an operation of the new terminal 140.

Referring to FIG. 19, the new terminal 140 may create an account of the added user in the server 120 in operation 1900, and may transmit the first user information to the server 120 in operation 1910. The new terminal 140 may receive the electronic device list managed by the terminal 130 from the server 120 in operation 1920, and may select at least one electronic device from the received electronic device list in operation 1930. The new terminal 140 may transmit the URI of the selected electronic device to the server 120 in operation 1940, and may receive a unique code of the selected electronic device from the server 120 in operation 1950. The new terminal 140 may request the server 120 to perform authentication of the added user in operation 1960. When the authentication is completed, the new terminal 140 may receive the authentication completion message from the server 120.

FIGS. 20A, 20B, 20C and 20D are diagrams illustrating examples of a message structure used in a home network system according to an embodiment of the present invention.

A middleware protocol used in an embodiment of the present invention may include a CoAP and a binary protocol. Referring to FIG. 20A, the binary protocol may include a version 2000, a message type 2005, a URI length 2010, a URI 2015, and a payload 2020, and is described in Table 1.

TABLE 1

| Field Name | Field Size (Byte) | Description |
| --- | --- | --- |
| Version | 1 | Protocol version 0x01 |
| Message Type | 1 | Message function<br>0x01: Advertisement<br>0x02: Discovery<br>0x03: Event Notification<br>0x04: Apply Complete<br>0x05: New Device Added<br>0x06: Authentication Complete |
| URI Length | 2 | Length of URI string (Byte) |
| URI | N | Described differently for each device and for each function |
| Payload | 1 | Described differently for each Message Type |

For example, advertisement messages may be exchanged between the electronic device 100 and the proxy 110 using the binary protocol, instead of using the CoAP. Referring to FIG. 20B, an advertisement message structure may include a version 2025, a message type 2030, a URI length 2035, a URI 2040, and a registration 2045.

TABLE 2

| Field Name | Field Size (Byte) | Description |
| --- | --- | --- |
| Version | 1 | Protocol version: 0x01 |
| Message Type | 1 | Advertisement: 0x01 |
| URI Length | 2 | Length of URI string (Byte) |
| URI | N | URI (IP Address) of terminal, electronic device or proxy |
| Registration | 1 | Describes whether electronic device is registered in proxy and server<br>0x00: Not Registered<br>0x01: Registered in Proxy<br>0x11: Registered in Cloud Server<br>0x12: Registered in Cloud Server but IP address Changed |

Middleware of the electronic device 100 may have IP information, and may update a value of "v{1}/config/registration" to "0x12" in response to a change in an IP of the middleware during booting of the electronic device 100. During advertisement, a registration field of a binary message having a value of "0x12" may be broadcast. When the registration field has the value of "0x12", middleware of the proxy 110 may read a serial code (for example, "get v{1}/config/serial") from the electronic device 100 and may notify the proxy 110 of the serial code. When an IP address is successfully updated, the middleware of the proxy 110 may change the value of "v{1}/config/registration" to "0x11" according to instruction "(put v{1}/config/registration)".

When an advertisement message is received from the electronic device 100, the proxy 110 may transmit, to the server 120, advertisement message indicating reception of the advertisement message. For example, a structure and description of an advertisement message are shown in Tables 3 and 4.

TABLE 3

| | | Request | | | Response (200 OK) | | | |
| --- | --- | --- | --- | --- | --- | --- | --- | --- |
| URI | Method | Members | Value | Required | Members | Value | Required | Error |
| {serverId}/ v{1}/ advertisement | PUT | advertisement | AdvInfo (Object Array) | true | | | | Refer to error message for 400 and 500 |

"URI" represents an Internet address to transfer a message, "Method" represents a format of a RESTful message, and "Request" represents a transferred message. "Members" represents detailed content of the transferred message, "Value" represents an actual value of the detailed content, and "Required" indicates whether an item is required. "{serverId}/v{1}/advertisement" represents an address of a cloud server to which an advertisement message is to be transferred, "AdvInfo(Object Array)" represents information required for advertisement, and "true" indicates that the item is required. When "PUT" is described in "Method," related information may be described in "Request."

TABLE 4

| Object Name | Members | Type | Description |
|---|---|---|---|
| AdvInfo | uri | string | External URI (deviceId) mapping electronic device in proxy e.g., 129.254.86.142/a |
| | registration | hex | Describes whether electronic device is registered in proxy<br>0x00: Not Registered<br>0x01: Registered in Proxy<br>0x11: Registered in Proxy and CloudServer |

"Objection Name" represents a name of "Request Value," "Members" represents detailed content of "Object Name," and "Type" represents a type of data for values of "Members." "AdvInfo" represents a request value for advertisement, "string" represents a string of characters, and "hex" represents a hexadecimal notation.

An advertisement message in JSON is shown below.

```
{
    "advertisement": [
        {
            "uri": "129.254.86.142/a/",
            "Registration": 00
        },
        {
            "uri": "129.254.86.142/b/",
            "Registration": 01
        }
    ]
}
```

The terminal 130 may periodically perform polling, and the server 120 may store advertisement message information. For example, the terminal 130 may read discovery information from the server 120. To this end, device advertisement information may need to be stored in the server 120. For example, a structure and description of a discovery message are shown in Tables 5 and 6.

sage, "Value" represents an actual value of the detailed content, and "Required" indicates whether an item is required. "{serverId}/v{1}/{userId}/discovery" represents an address of a cloud server that is to send a request for a discovery message, "DisInfo(Object Array)" represents information required for discovery, and "true" indicates that the item is required. When "GET" is described in "Method," related information may be described in "Response."

TABLE 6

| Object Name | Members | Type | Description |
|---|---|---|---|
| disInfo | uri | string | External URI (deviceId) mapping URI of electronic device managed by proxy in cloud |
| | registration | hex | Describes whether electronic device is registered in proxy<br>0x00: Not Registered<br>0x01: Registered in Proxy<br>0x11: Registered in Proxy and Cloud Server |

"Objection Name" represents a name of "Response Value," "Members" represents detailed content of "Object Name," and "Type" represents a type of data for values of "Members." "disInfo" represents a response value to a discovery request, "string" represents a string of characters, and "hex" represents a hexadecimal notation.

A discovery message in JSON is shown below.

```
{
    "discovery": [
        {
            "uri": "111.245.11.10/v1/129.254.86.142/a/",
            "Registration": 11
        },
        {
            "uri": "111.245.11.10/v1/129.254.86.142/b/",
            "Registration": 11
        }
    ]
}
```

The proxy 110 may transmit an advertisement message to the server 120. When the advertisement message is received, the server 120 may update information "v{1}/{userId}/discovery." Here, a structure and description of the advertisement message are shown in Tables 3 and 4.

Also, the proxy 110 may transmit a discovery message to the electronic device 100. When the discovery message is received, the electronic device 100 may transmit an advertisement message as a response to the discovery message. For the discovery message, the binary protocol, instead of

TABLE 5

| URI | Method | Request | | | Response (200 OK) | | | Error |
|---|---|---|---|---|---|---|---|---|
| | | Members | Value | Required | Members | Value | Required | |
| {serverId}/v{1}/{userId}/discovery (Discovery information request) | GET | | | | discovery | DisInfo (Object Array) | true | Refer to error message for 400 and 500 |

"URI" represents an Internet address to transfer a message, "Method" represents a format of a RESTful message, and "Response" represents a response to a request message. "Members" represents detailed content of a response mesthe CoAP, may be used. Referring to FIG. 20C, a discovery message may include a version 2050, a message type 2055, a URI length 2060 and a URI 2065, and a related description is presented in Table 7.

TABLE 7

| Field Name | Field Size | Description |
|---|---|---|
| Version | 1 | Protocol version 0x01 |
| Message Type | 1 | Device Discovery: 0x02 |
| URI Length | 2 | Length of URI string (Byte) |
| URI | N | URI (IP address of proxy) of device requesting discovery |

When the advertisement message of the electronic device 100 is received from the electronic device 100, and when a registration field corresponding to a payload has a value of "0x00," the proxy 110 may read a unique serial code based on a CoAP message. When registration of the electronic device 100 is completed in the proxy 110, a registration state of the electronic device 100 may be updated. Here, for a registration message, the CoAP may be used, and a structure and description of the registration message are shown in Table 8.

TABLE 8

| Field Name | Field Size | Description | |
|---|---|---|---|
| Client (Proxy) | Message Type | Uses confirmable (CON) message | |
| | Method | Uses GET to read serial code and user information<br>Uses PUT to update registration state of electronic device | |
| | URI | Serial code | v{1}/config/serial |
| | | User information | v{1}/config/user |
| | | Registration state update | v{1}/config/registration |
| | Payload | Registration update | If registration in proxy is completed (if PUT method is used), "0x01" is used<br>If registration in server is completed (if PUT method is used), "0x11" is used |
| Server (Device) | ACK | | Serial code: transfers unique serial code of device (32 Bytes text)<br>User information: transfers user information received from application, etc. (48 Bytes text)<br>ID (16 Bytes)<br>Password (16 Bytes)<br>Phone Number (16 Bytes)<br>Registration update<br>200 (OK) response SHOULD be returned<br>If no resource exists then the server MAY create a new resource with that URI, resulting in a 201 (Created) response<br>If the resource could not be created or modified, then an appropriate error response code SHOULD be sent. |

"Client(Proxy)" represents a message used in the proxy 110, and "Server(Device)" represents a message used in the electronic device 100. "Acknowledgement (ACK)" represents a response to a "GET" or "PUT" request sent from the proxy 110 to the electronic device 100.

When the electronic device 100 is registered in the proxy 110, the proxy 110 may create an external "URI (ID)" mapped to an "URI" of the electronic device 100, and may transfer "URI" information and a unique code of the electronic device 100 to a service node. A structure and description of a registration message are shown in Tables 9 and 10. In Table 10, "RegReqInfo" represents a value for a registration request.

TABLE 9

| | | Request | | | Response (200 OK) | | | |
|---|---|---|---|---|---|---|---|---|
| URI | Method | Members | Value | Required | Members | Value | Required | Error |
| {serverId}/<br>v{1}/config/<br>registration<br>(registration<br>request) | PUT | registrationReq | RegReqInfo<br>(Object) | true | | | | Refer to error message for 400 and 500 |

TABLE 10

| Object Name | Members | Type | Description |
|---|---|---|---|
| RegReqInfo | uri | string | External URI (deviceId) mapping internal device in proxy |
| | serialCode | string | Unique code of WoT device |
| | id | string | User ID |
| | password | string | User Password |
| | phone | string | User's phone number |

A registration message in JSON is shown below.

```
# Registration Request
{
    "registrationReq": {
        "uri": "129.554.55.12/a",
        "serialCode": "56543dswdfs-0ri0",
        "id": "etri",
        "password": "123456",
        "phone": "01111112222"
    }
}
```

When the registration of the electronic device 100 is completed in the server 120 and when a registration result is transmitted to the electronic device 100, the proxy 110 may notify the terminal 130 of completion of the registration of the electronic device 100 using a broadcast message. Here, for a registration message, the binary protocol may be used. The registration message may include the version 2050, the message type 2055, the URI length 2060 and the URI 2065 as shown in FIG. 20C, and a related description is presented in Table 11.

TABLE 11

| Field Name | Field Size | Description |
|---|---|---|
| Version | 1 | Protocol version: 0x01 |
| Message Type | 1 | New Device Added: 0x05 |
| URI Length | 2 | Length of URI string (Byte) |
| URI | N | URI (URI managed in proxy) of registered device |

When the server 120 directly notifies the terminal 130 of the completion of the registration of the electronic device 100, a registration message in JSON may be used. In the registration message, "uri" represents an external URI (for example, an external IP address) of the registered electronic device 100, "serialCode" represents a serial code of the registered electronic device 100, and "id" and "password" represents an ID and password of a user who registered the electronic device 100, respectively.

A registration message in JSON is shown below.

```
{
  "newDevice":{
      "uri": "129.254.86.142/device0",
      "serialCode":"1234r3-r3r3klnff ",
      "id": "test",
      "password": "test" /
      }
}
```

Information on the electronic device 100 may include, for example, a name, a type, a model name, a manufacturer name, an H/W version and a firmware version. For example, the terminal 130 may send a request for the information on the electronic device 100 to the server 120, and may receive the information as an "ACK." To this end, the server may register the information on the electronic device 100. Here, a structure and description of an information message are shown in Tables 12 and 13. In Table 12, "informationRes" represents a response value to a request for device information.

An information message in JSON is shown below.

```
# Information Response
{
    "informationRes": [
        {
            "deviceName": "test",
            "deviceType": 1600,
            "modelName": "test",
            "manufacturer": "test",
            "serverURI": "122.11.5.5",
            "hwVersion": "1.1.1",
            "firmware Version": "1.1.2"
        }
    ]
}
```

Also, the server 120 may transmit an information message to request information to the proxy 110. For the information message, an HTTP may be used. A structure and description of the information message are shown in Tables 14 and 15.

TABLE 12

| URI | Method | Request | | | Response (200 OK) | | | Error |
| --- | --- | --- | --- | --- | --- | --- | --- | --- |
| | | Members | Value | Required | Members | Value | Required | |
| {serverId}/ v{1}/ {deviceId}/ info | GET | | | | informationRes | DeviceInfo (Object Array) | true | Refer to error message for 400 and 500 |

TABLE 13

| Object Name | Members | Type | Description |
| --- | --- | --- | --- |
| DeviceInfo | deviceName | string | Device name |
| | deviceType | hex | Device type |
| | modelName | string | Model name |
| | manufacturer | string | Manufacturer name |
| | serverURI | string | Service server URI |
| | hwVersion | string | H/W version |
| | firmwareVersion | string | Firmware version |

TABLE 14

| URI | Method | Request | | | Response (200 OK) | | | Error |
| --- | --- | --- | --- | --- | --- | --- | --- | --- |
| | | Members | Value | Required | Members | Value | Required | |
| {serverId}/ v{1}/ {deviceId}/ info | PUT | informationRes | DeviceInfo (Object Array) | true | | | | Refer to error message for 400 and 500 |

TABLE 15

| Object Name | Members | Type | Description |
| --- | --- | --- | --- |
| DeviceInfo | deviceName | string | Device name |
|  | deviceType | hex | Device type (refer to Annex A) |
|  | modelName | string | Model name |
|  | manufacturer | string | Manufacturer name |
|  | serverURI | string | Service server URI |
|  | hwVersion | string | H/W version |
|  | firmwareVersion | string | Firmware version |

An information message in JSON is shown below.

```
# Information Response
{
  "informationRes": [
    {
      "deviceName": "test",
      "deviceType": 1600,
      "modelName": "test",
      "manufacturer": "test",
      "serverURI": "122.11.5.5",
      "hwVersion": "1.1.1",
      "firmwareVersion": "1.1.2"
    }
  ]
}
```

The proxy 110 may send a request for information to the electronic device 100. When an information message to request information is received from the server 120, the proxy 110 may transmit the received information message to the electronic device 100. For the information message used between the proxy 110 and the electronic device 100, the CoAP may be used. A structure and description of the information message are shown in Table 16. In Table 16, a message type indicates whether a message is a CON message or a non-confirmable (NON) message. A CON message may require an acknowledgement, and a NON message may not require an acknowledgement.

TABLE 16

| Field Name | Field Size | Description |
| --- | --- | --- |
| Client (Proxy) | Message Type | Uses CON message |
|  | Method | Uses GET to read electronic device information |
|  | URI | Device name: IP address/device/info/name<br>Device type: IP address/device/info/type<br>Model name: IP address/device/info/model<br>Manufacturer name: IP address/device/info/manufacturer<br>Service server URI: IP address/device/info/serveruri<br>H/W version: IP address/device/info/hwversion<br>Firmware version: IP address/device/info/fwversion |

TABLE 16-continued

| Field Name | Field Size | Description |
| --- | --- | --- |
| Server (Device) | ACK | Device name: 16 Bytes String<br>Device type: 2 Bytes Hexcode (refer to Annex A)<br>Model name: 16 Bytes String<br>Manufacturer name: 16 Bytes String<br>Service server UR: 32 Bytes String<br>H/W version: 16 Bytes String<br>Firmware version: 16 Bytes String |

When an event occurs in the electronic device 100, the electronic device 100 may notify the proxy 110 of a situation in which the event occurs, through a broadcast, and the proxy 110 may verify an even value based on an event URI through a CoAP message. Here, for an event notification message, the binary protocol or the CoAP may be used, and a structure and description of the event notification message are shown in FIG. 20C and Tables 17 and 18.

TABLE 17

| Field Name | Field Size | Description |
| --- | --- | --- |
| Version | 1 | Protocol version: 0x01 |
| Message Type | 1 | Event Notification: 0x03 |
| URI Length | 2 | Length of URI string (Byte) |
| URI | N | Describes URI managing event information<br>URI is described based on<br>"/v{1}/event/{event_name }," and event_name is based on profiles for each device. |

TABLE 18

| Field Name | Field Size | Description |
| --- | --- | --- |
| Client (Proxy) | Message Type | Uses CON message |
|  | Method | Uses GET to read value of URI |
|  | URI | Uses URI (EVENT URI) included in EVENT_NOTIFICATION binary message |
| Server (Device) | ACK | Transfers updated URI content value as ACK to client<br>Value of ACK is based on profiles for each device. |

When an event notification message is received from the electronic device 100, the proxy 110 may transmit the event notification message to the server 120. A structure and description of the event notification message are shown in Tables 19 and 20. In Table 19, "event" represents a request message for event transfer, and "EventInfo (Object Array)" represents a value of an event.

TABLE 19

| URI | Method | Request |  |  | Response (200 OK) |  |  | Error |
| --- | --- | --- | --- | --- | --- | --- | --- | --- |
|  |  | Members | Value | Required | Members | Value | Required |  |
| {serverId}/v{1}/event | PUT | event | EventInfo (Object Array) | true |  |  |  | Refer to error message for 400 and 500 |

TABLE 20

| Object Name | Members | Type | Description |
| --- | --- | --- | --- |
| EventInfo | eventName | string | Event name |
|  | eventValue | string | Event value |

An event notification message in JSON is shown below.

```
# Event
{
   "event": [
      {
         "eventName": "a",
         "eventValue": "1"
      },
      {
         "eventName": "b",
         "eventValue": "2"
      }
   ]
}
```

When the server 120 receives an event notification message, the terminal 130 may know event information if necessary. Here, a structure and description of the event notification message are shown in Tables 21 and 22.

TABLE 21

|  |  | Request |  |  | Response (200 OK) |  |  |  |
| --- | --- | --- | --- | --- | --- | --- | --- | --- |
| URI | Method | Members | Value | Required | Members | Value | Required | Error |
| {serverId}/ v{1}/ {deviceId}/ event | GET |  |  |  | event | EventInfo (Object Array) | true | Refer to error message for 400 and 500 |

TABLE 22

| Object Name | Members | Type | Description |
| --- | --- | --- | --- |
| EventInfo | eventName | hex | Event name |
|  | eventValue | string | Event value |

```
"eventValue": "1"
},
{
   "eventName": "b",
   "eventValue": "2"
}
]
}
```

Between the server 120 and the terminal 130, the server 120 may receive a control message for a control request from the terminal 130, and a control URI and message for each device may be based on predetermined WoT profiles for each device. Between the server 120 and the proxy 110, the server 120 may receive a control message for a control request from the terminal 130 and may transmit the control message to the proxy 110. Here, for the control message, the HTTP may be used, and a control URI and message for each device may be based on predetermined WoT profiles for each device. For example, the predetermined WoT profiles may be shown in Tables 23 and 24. Tables 23 and 24 relate to an electric light.

TABLE 23

|  |  | Request |  |  | Response (200 OK) |  |  |  |
| --- | --- | --- | --- | --- | --- | --- | --- | --- |
| URI | Method | Members | Value | Required | Members | Value | Required | Error |
| /v1/lights (checking whole state, setting, deleting) | GET |  |  |  | ControlReq | Object | true | Refer to error message for 400 and 500 |
|  | PUT DELETE | ControlReq | Object | true |  |  |  |  |

An event notification message in JSON is shown below.

```
# Event
{
   "event": [
      {
         "eventName": "a",
```

TABLE 24

| Object Name | Members | Type | Description |
| --- | --- | --- | --- |
| ControlReq | proxyId | String | Proxy ID |
|  | lights | Array[Light] | Array of light |
|  | light | Object |  |
|  | error | Object |  |

TABLE 24-continued

| Object Name | Members | Type | Description |
|---|---|---|---|
| Light | deviceId | String | Light ID |
|  | onOff | Int | On, Off |
|  | dimming | Int | 0~10, Dimming level |
|  | color | Int | 0~3 |
| Error | Status | String | 401, 404, 501, etc. |
|  | Message | String | Error message |
|  | errorCode | int | Error code |

When a control message for a control request is received from the server 120, the proxy 110 may transmit the message to the electronic device 100. Here, for the control message, the CoAP may be used, and a structure and description of the control message are shown in Table 25.

TABLE 25

| Field Name | Field Size | Description |
|---|---|---|
| Client (Proxy) | Message Type | Uses CON message |
|  | Method | Uses PUT to transfer (update) control code |
|  | URI | Described as IP/v{1}/{controlName} |
|  | Payload | Described differently based on controlName, and is based on profile of electronic device. |
| Server (Device) | ACK | 200 (OK) response SHOULD be returned |
|  |  | If no resource exists then the server MAY create a new resource with that URI, resulting in a 201 (Created) response |
|  |  | If the resource could not be created or modified, then an appropriate error response code SHOULD be sent. |

Also, the server 120 may receive an apply message to request applying from the terminal 130. The apply message may include a request message, a response message and a result message. A structure and description of the apply message are shown in Tables 26 and 27.

"firmwareUri" represents an address where firmware is to be downloaded, "rollback(object)" represents a message for a system rollback request, and "apConnection(object)" represents a message for an AP connection request.

TABLE 27

| Object Name | Members | Type | Description |
|---|---|---|---|
| — | firmwareUri | string | URI for downloading of firmware |
| RollBackInfo | firmwareVersion | string | Firmware version for Rollback |
|  | firmwareUri | string | URI for downloading of firmware |
| Connection Info | ssid | string | SSID for connection |
|  | password | string | Password of SSID for connection |
| — | result | hex | 0x01: Success |
|  |  |  | 0x00: Fail |

An apply message in JSON is shown below.

```
# ApplyRequest
{
    "apConnection": {
        "ssid": "test",
        "password": "test"
    }
}
#Apply Result
{
    "result": 01
}
```

When an apply message to request applying is received from the terminal 130, the server 120 may transmit the apply message to the proxy 110. Here, for the apply message, the HTTP may be used, and a structure and description of the apply message are shown in Tables 28 and 29.

TABLE 26

| URI | Method | Request | | | Response (200 OK) | | | Error |
|---|---|---|---|---|---|---|---|---|
|  |  | Members | Value | Required | Members | Value | Required |  |
| {serverId}/v{1}/{deviceId}/apply/update (Update request) | PUT | firmwareUri | string | true |  |  |  | Refer to error message for 400 and 500 |
| {serverId}/v{1}/{deviceId}/apply/rollBack (RollBack request) | PUT | rollback (object) | RollBackInfo | true |  |  |  | Refer to error message for 400 and 500 |
| {serverId}/v{1}/{deviceId}/apply/apConnection (Connection request) | PUT | apConnection (object) | ConnectionInfo | true |  |  |  | Refer to error message for 400 and 500 |
| {serverId}/v{1}/{deviceId}/apply/{applyName}/result (Apply result) | GET |  |  |  | result | hex | true | Refer to error message for 400 and 500 |

TABLE 28

| URI | Method | Request | | | Response (200 OK) | | | Error |
|---|---|---|---|---|---|---|---|---|
| | | Members | Value | Required | Members | Value | Required | |
| {deviceId}/v{1}/apply/update (Apply request) | PUT | firmwareUri | string | true | | | | Refer to error message for 400 and 500 |
| {deviceId}/v{1}/apply/rollBack (Apply request) | PUT | rollback | RollBackInfo (object) | true | | | | Refer to error message for 400 and 500 |
| {deviceId}/v{1}/apply/apConnection (Apply request) | PUT | apConnection | ConnectionInfo (object) | true | | | | Refer to error message for 400 and 500 |
| {serverId}/v{1}/{deviceId}/apply/{applyName}/result (Apply result) | PUT | result | hex | true | | | | Refer to error message for 400 and 500 |

TABLE 29

| Object Name | Members | Type | Description |
|---|---|---|---|
| — | firmwareUri | string | URI for downloading of firmware |
| RollBackInfo | firmwareVersion | string | Firmware version for Rollback |
| | firmwareUri | string | URI for downloading of firmware |
| Connection Info | ssid | string | SSID for connection |
| | password | string | Password of SSID for connection |
| — | result | hex | 0x01: Success 0x00: Fail |

An apply message in JSON is shown below.

```
# ApplyRequest
{
    "apConnection": {
        "ssid": "test",
        "password": "test"
    }
}
#Apply Result
{
    "result": 01
}
```

When an apply request message is received from the server 120, the proxy 110 may send a request for applying to the electronic device 100 based on a CoAP message. When an applying process is completed, the electronic device 100 may notify the proxy 110 of a result of the applying process based on the binary protocol. For an apply message between the proxy 110 and the electronic device 100, both the binary protocol and the CoAP may be used. Referring to FIG. 20D, the binary protocol may include a version 2070, a message type 2075, an URI length 2080, an URI 2085 and an apply result 2090, and a description thereof and a description of the CoAP are shown in Tables 30 and 31.

TABLE 30

| Field Name | Field Size | Description |
|---|---|---|
| Version | 1 | Protocol version: 0x01 |
| Message Type | 1 | Apply Complete: 0x04 |
| URI Length | 2 | Length of URI string (Byte) |
| URI | N | Described as v{1}/apply/{applyName} |

TABLE 30-continued

| Field Name | Field Size | Description |
|---|---|---|
| Apply Result | 1 | Describes whether applying is performed normally 0x01: Success 0x00: Fail |

TABLE 31

| Field Name | Field Size | Description |
|---|---|---|
| Client (Proxy) | Message Type | Uses CON message |
| | Method | Uses PUT to update binary of target URI |
| | URI | Described as v{1}/apply/{applyName} |
| | Payload | Described differently based on applyName |
| | applyName | Payload |
| | update | Firmware File |
| | rollBack | Firmware File |
| | apConnection | 32 Bytes text SSID (16 bytes string) Password (16 bytes string) |
| Server (Device) | ACK | 200 (OK) response SHOULD be returned If no resource exists then the server MAY create a new resource with that URI, resulting in a 201 (Created) response If the resource could not be created or modified, then an appropriate error response code SHOULD be sent. |

Data to be described in a payload may include, for example, a file to be updated in response to an update request based on a type of apply requests, a rollback file of a desired time in response to a rollback request, and an SSID and a password of an AP in response to an AP connection request. As an ACK, a general web ACK may be used.

When a message indicating registration of a new device is received from the proxy 110, the terminal 130 may transmit the unique code of the electronic device 100 for a request for an authority to access the new device to the proxy 110. For example, an authentication message between the terminal 130 and the server 120 may include a "request" message and a "response" message. When authentication is completed, device information of "v{1}/{userId}/discovery" may also be updated. A structure and description of an authentication message are shown in Tables 32 and 33.

TABLE 32

| URI | Method | Request Members | Value | Required | Response (200 OK) Members | Value | Required | Error |
|---|---|---|---|---|---|---|---|---|
| {serverId}/v{1}/ {userId}/authen (Authentication request) | PUT | authenticationReq | AuthenCode (object) | true | | | | Refer to error message for 400 and 500 |

TABLE 33

| Object Name | Members | Type | Description |
|---|---|---|---|
| AuthenCode | uri | string | URI of device connected to proxy managed in cloud |
| | serialCode | string | Unique code of electronic device |
| | id | string | User ID |
| | password | string | User Password |
| | type | hex | 0x01: Master Add |
| | | | 0x02: Master Delete |
| | | | 0x11: Sub Add |
| | | | 0x12: Sub Delete |

An authentication message in JSON is shown below.

```
#Authentication Request
{
    "authenticationReq": {
        "uri": "111.25.51.10/129.254.86.10/a",
        "serialCode": "1234r3-r3r3klnff",
        "id": "test",
        "password": "test",
        "type":00
    }
}
```

An authentication message between the proxy 110 and the server 120 may include a "request" message and a "response" message, and a structure and description of the authentication message are shown in Tables 34 and 35.

TABLE 34

| URI | Method | Request Members | Value | Required | Response (200 OK) Members | Value | Required | Error |
|---|---|---|---|---|---|---|---|---|
| {deviceId}/v{1}/ authen (Authentication request) | PUT | authenticationReq | AuthenCode (object) | true | | | | Refer to error message for 400 and 500 |

TABLE 35

| Object Name | Members | Type | Description |
|---|---|---|---|
| AuthenCode | serialCode | string | Unique code of electronic device |
| | id | string | User ID |
| | password | string | User Password |
| | type | hex | 0x01: Master Add |
| | | | 0x02: Master Delete |
| | | | 0x11: Sub Add |
| | | | 0x12: Sub Delete |

An authentication message in JSON is shown below.

```
#Authentication Request
{
    "authenticationReq": {
        "serialCode": "1234r3-r3r3klnff",
        "id": "test",
        "password": "test",
        "type":00
    }
}
```

According to an embodiment of the present invention, the terminal 130 may include a receiver, a transmitter, a display and a controller, although not shown in the drawings. The receiver may receive data, the transmitter may transmit data, and the display may display data. The controller may control an overall operation of the terminal 130, for example, to perform user authentication.

The electronic device 100 may include a receiver, a transmitter, a display and a controller, although not shown in the drawings. The receiver may receive data, the transmitter may transmit data, and the display may display data. The controller may control an overall operation of the electronic device 100, for example, control the electronic device 100 to transmit registration information for registration of the electronic device 100.

The proxy 110 may include a receiver, a transmitter and a controller, although not shown in the drawings. The receiver may receive data, and the transmitter may transmit data. The controller may control an overall operation of the proxy 110, for example, control the proxy 110 to register the electronic device 100 or to perform user authentication.

The server 120 may include a receiver, a transmitter and a controller, although not shown in the drawings. The receiver may receive data, and the transmitter may transmit data. The controller may control an overall operation of the server 120, for example, control the server 120 to register the electronic device 100.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of providing a home network service, the method comprising:
   creating a user account in a server;
   receiving first initial setting information from an electronic device;
   transmitting second initial setting information to the electronic device;
   receiving a message regarding registration of the electronic device from the server;
   requesting the server to transmit a user list of users using the electronic device;
   receiving the user list from the server; and
   requesting the server to perform deauthentication of a predetermined user among the users.

2. The method of claim 1, further comprising:
   receiving a request for addition of a new user from the server;
   transmitting an approval for the addition of the new user to the server;
   receiving, from the server, a user addition request to control and manage an electronic device of the new user; and
   transmitting a user addition approval to the server.

3. A method of providing a home network service, the method comprising:
   transmitting first initial setting information to a terminal;
   receiving second initial setting information from the terminal;
   transmitting registration information for registration of an electronic device to a proxy;
   receiving a registration state update message from the proxy;
   wherein the first initial setting information comprises a unique code of the electronic device; and
   the second initial setting information comprises at least one of a password and a Service Set Identifier (SSID) of the proxy and the ID and password used in the user account.

4. The method of claim 3, wherein the registration information comprises at least one of a password and an Identification (ID) used in a user account generated in a server, terminal information and a unique code of the electronic device.

5. A method of providing a home network service, the method comprising:
   receiving registration information for registration of an electronic device from the electronic device;
   registering the electronic device;
   transmitting the registration information to a server;
   receiving a registration completion message indicating completion of the registration of the electronic device from the server;
   transmitting a registration state update message to the electronic device;
   receiving information for user authentication from the server and performing authentication;
   receiving a user deauthentication request message from the server; and
   performing user deauthentication.

* * * * *